(12) United States Patent  
Matsushita et al.

(10) Patent No.: US 8,320,493 B2  
(45) Date of Patent: Nov. 27, 2012

(54) WIRELESS COMMUNICATION SYSTEM

(75) Inventors: Yoshiteru Matsushita, Chiba (JP); Seiichi Sanpei, Ikeda (JP)

(73) Assignee: Sharp Kabushiki Kaisha, Osaka (JP)

( * ) Notice: Subject to any disclaimer, the term of this patent is extended or adjusted under 35 U.S.C. 154(b) by 1661 days.

(21) Appl. No.: 11/587,580

(22) PCT Filed: Apr. 27, 2005

(86) PCT No.: PCT/JP2005/008071  
§ 371 (c)(1), (2), (4) Date: Oct. 25, 2006

(87) PCT Pub. No.: WO2005/107119  
PCT Pub. Date: Nov. 10, 2005

(65) Prior Publication Data  
US 2007/0177683 A1  Aug. 2, 2007

(30) Foreign Application Priority Data  
Apr. 30, 2004  (JP) .................................. 2004-136101

(51) Int. Cl.  
*H03C 5/00* (2006.01)

(52) U.S. Cl. ......... 375/268; 375/260; 375/271; 375/285

(58) Field of Classification Search .................. 375/259, 375/260, 262, 267, 299, 220; 370/342, 329, 370/208, 498  
See application file for complete search history.

(56) References Cited

U.S. PATENT DOCUMENTS

| | | | |
|---|---|---|---|
| 5,119,483 A | 6/1992 | Madden et al. | |
| 6,359,934 B1 * | 3/2002 | Yoshida | 375/262 |
| 6,452,964 B1 * | 9/2002 | Yoshida | 375/222 |
| 6,510,156 B1 | 1/2003 | Brock et al. | |
| 7,010,613 B2 | 3/2006 | Connor | |
| 7,054,375 B2 * | 5/2006 | Kannan et al. | 375/260 |
| 7,161,928 B2 | 1/2007 | Moerder | |

(Continued)

FOREIGN PATENT DOCUMENTS

JP   2002-9734 A   1/2002

OTHER PUBLICATIONS

Toyopki Ue, et al, "Symbol Rate and Modulation Level-Controlled Adaptive Modulation/TDMA/TDD System for High-Bit-Rate Wireless Data Transmission", IEEE vol. 47, No. 4, Nov. 1998, pp. 1134-1147.*

(Continued)

*Primary Examiner* — David Ometz  
*Assistant Examiner* — Qutbuddin Ghulamali  
(74) *Attorney, Agent, or Firm* — Birch, Stewart, Kolasch & Birch, LLP

(57) ABSTRACT

Improvement of transmission efficiency is sought by stopping transmission of unnecessary MLI data.

A transmitting circuit 111 in a base station apparatus 110 has an MLI modulation part 248 composed of an MLI generating circuit 238, a symbol modulation circuit 239, and an IFFT circuit 240, a user data modulation part 249 composed of an encoder circuit 234, a symbol modulation circuit 235, a transmission power control circuit 236, and an IFFT circuit 237, and a transmission operation control circuit 113. The transmission operation control circuit 113 controls operation timing of the MLI modulation part 248, the user datamodulation-part 249, and a multiplexer 243 based on a signal to notify that ACK input from a receiving circuit 112 has been received so that slots containing no MLI data are generated.

4 Claims, 20 Drawing Sheets

U.S. PATENT DOCUMENTS

| | | | |
|---|---|---|---|
| 7,328,283 | B2 | 2/2008 | Tan et al. |
| 2001/0048680 | A1 | 12/2001 | Yoshimura et al. |
| 2001/0055287 | A1 | 12/2001 | Sawada et al. |
| 2002/0114379 | A1* | 8/2002 | Uesugi et al. ............ 375/219 |
| 2003/0112778 | A1 | 6/2003 | Lundby |
| 2003/0133432 | A1 | 7/2003 | Moerder |
| 2004/0081151 | A1 | 4/2004 | Greis et al. |
| 2004/0174846 | A1 | 9/2004 | Kwon et al. |
| 2005/0054319 | A1* | 3/2005 | Tamaki et al. ............ 455/296 |
| 2005/0186983 | A1 | 8/2005 | Iochi |
| 2005/0213505 | A1 | 9/2005 | Iochi et al. |
| 2005/0238008 | A1 | 10/2005 | Fraser |
| 2006/0256732 | A1 | 11/2006 | Hamalainen |
| 2011/0190018 | A1 | 8/2011 | Love et al. |

OTHER PUBLICATIONS

Tomoaki Yoshiki et al, "High Bit Rate Transmissioin Scheme with a Multilevel Transmit Power Control for the OFDM Adaptive Modulation Systems". IEEE, Vehicular Technology conference, spring 2001, vol. 1, pp. 727-731.*

Toshiyuki Nakanishi et al., The Institute of Electronics, Information and Communication Engineers Gijutsu Kenkyu Hokoku, RCS2002-239, Jan. 16, 2003, pp. 59 to 64.

Yoshiki, T. et al., Vehicular Technology Conference, 2001, VTC 2001, Spring, IEEE VTS 53rd, May 9, 2001, pp. 727 to 731.

Takashi Baba et al., The Institute of Electronics, Information and Communication Engineers Gijutsu Kenkyu Hokoku, RCS2003-279, Jan. 16, 2004, pp. 11 to 16.

Nakanishi T. et al.: "Proposal of 1-cell reuse OFDM/TDMA using subcarrier adaptive modulation and multilevel transmittal power control for broadband wireless communication systems". XP010701447 (Abstract Only), Oct. 6-9, 2003.

Extended European Search Report dated Feb. 2, 2011 for Application No. 10171095.2.

Extended European Search Report dated Jan. 27, 2011 for Application No. 10171098.6.

Nakanishi T. et al.: "Proposal of 1-cell reuse OFMD/TDMA using subcarrier adaptive modulation and multilevel transmit power control for broadband wireless communication systems", IEEE, vol. 4, pp. 2476-2480, Oct. 6, 2003, XP010701447.

European Search Report issued in European Patent Application No. 05736744.3 on Oct. 15, 2008.

U.S. Office Action issued in U.S. Appl. No. 12/850,482 on Sep. 14, 2012.

U.S. Office Action issued in U.S. Appl. No. 12/850,507 on Sep. 14, 2012.

* cited by examiner

WIRELESS COMMUNICATION SYSTEM

TECHNICAL FIELD

The present invention relates to a wireless communication system that conducts wireless communication by a multi-carrier modulation system using a communication frame composed of a plurality of slots.

BACKGROUND ART

A wireless communication system in which an Orthogonal Frequency Division Multiplexing (hereinafter referred to as "OFDM") transmission system is adopted has been known. The OFDM is a kind of multi-carrier modulation system and has, compared with a conventional single-carrier modulation system, higher resistance to multi-path fading caused when channel is intricate due to obstacles.

However, even though an OFDM signal is used, when a desired signal to noise power ratio (hereinafter referred to as "SNR") is not obtained due to lower received power of sub-carriers at specific frequencies caused by multi-path fading, as shown in FIG. 15, part of data cannot be demodulated, causing reduced transmission capacity as a system.

To solve such a problem, a technique of applying Multi-level Transmit Power Control (hereinafter referred to as "MTPC") has been proposed in which an adaptive modulation scheme is applied by which sub-carriers whose attenuation of received power is significant due to multi-path fading are transmitted using a small multilevel modulation scheme and sub-carriers whose attenuation of received power is small are transmitted using a high multilevel modulation scheme, and transmission power of sub-carriers that transmit data is adjusted so that a desired SNR is obtained. This MTPC system is a system that is gaining attention as a countermeasure against multi-path fading from the viewpoint of limiting a maximum value of transmission power and the like and using sub-carriers efficiently.

FIG. 17 is a diagram showing a configuration example of a frame format of a wireless communication system in which the OFDM/MTPC system is adopted. This frame format is used when, for example, establishing a downlink from a base station apparatus to a mobile station apparatus. As shown in FIG. 17, a transmission frame (communication frame) 201 is composed of 10 slots 202-1 to 202-10. Each of the slots 202-1 to 202-10 is primarily composed of two parts; a synchronization/control data part 203 and a user data part 204.

The synchronization/control data part 203 includes a Channel Estimation word 205 (hereinafter referred to as "CE") known to a receiving side and is used for estimating channels and modulation level information 206 (hereinafter referred to as "MLI") to notify the receiving side of a modulation level of each sub-carrier that transmits user data. These define the modulation level of each sub-carrier and transmission power of each sub-carrier, and are features of the OFDM/MTPC system. Here, the MLI is updated for each communication frame.

When transmitting a signal in the frame format shown in FIG. 17, the synchronization/control data part 203 is transmitted using the OFDM system. That is, the same modulation level is applied to all sub-carriers with the same transmission power.

The user data part 204 is transmitted using the MTPC system. That is, each sub-carrier is transmitted by a modulation level with a different multilevel modulation scheme and transmission power is controlled for each sub-carrier. More specifically, the following is done:

(1) The modulation level for each sub-carrier is one designated by MLI of the synchronization/control data part.
(2) Transmission power of each sub-carrier is adjusted depending on quality of channels so that a desired reception SNR is obtained for each sub-carrier on the receiving side.
(3) A sub-carrier whose channel is of extremely low quality may be made a carrier hole by providing no transmission power.

Since fluctuation velocity of a channel with respect to a frame length is slow in general communication, transmission power and the modulation level do not need to be changed within the same frame. Consequently, there is no need to change transmission power and the modulation level within the same communication frame. Thus, MLI is all the same within the same communication frame.

Next, a configuration example of a mobile station apparatus applied to an OFDM/MTPC communication system will be described. As shown in FIG. 18, a mobile station apparatus 208 has a receiving circuit 209 and a transmitting circuit 210. An RF signal received by a receiving antenna 211 is down-converted by an RF converter 212 and input into the receiving circuit 209. An output signal of the RF converter 212 input into the receiving circuit 209 is input into an analog/digital conversion circuit 213 to convert the signal from an analog signal into a digital signal. A digital signal output by the analog/digital conversion circuit 213 is input into a demultiplexer 214 to demultiplex and output the signal to a CE part 205, an MLI symbol part 206, and a user data symbol part 204 in accordance with a slot configuration shown in FIG. 17.

A Fourier transformation circuit (FFT circuit) 215-1 performs a Fourier transformation of an output signal of the demultiplexer 214 to reproduce a received CE. A channel estimation circuit 216 compares a received CE input from the Fourier transformation circuit 215-1 and a reference CE to estimate channel characteristics.

A Fourier transformation circuit (FFT) 215-2 performs a Fourier transformation of an output signal of the demultiplexer 214 to reproduce a received MLI symbol. A channel compensation circuit 217 makes channel compensation for a reproduced received MLI symbol based on an estimation result of the channel estimation circuit 216. A symbol demodulation circuit 218 demodulates MLI from the received MLI symbol for which channel compensation has been made by the channel compensation circuit 217. An error detection circuit 219 detects errors from an output signal of the symbol demodulation circuit 218 using error detecting code and the like.

A demodulation level designation circuit 220 designates a demodulation level of each sub-carrier of user data based on the demodulated MLI.

A Fourier transformation circuit (FFT) 215-3 performs a Fourier transformation of an output signal of the demultiplexer 214 to reproduce a received user data. A channel compensation circuit 221 makes channel compensation for a reproduced received user data symbol based on an estimation result of the channel estimation circuit 216. A symbol demodulation circuit 222 demodulates the received user data symbol for which channel compensation has been made by the channel compensation circuit 221 by a demodulation level of a user data symbol part of each sub-carrier designated by the demodulation level designation circuit 220. A decoder circuit 223 performs error correction and decompression processing of encoded user data demodulated by the symbol demodulation circuit 222 to decode user data.

In the receiving circuit 209 shown in FIG. 18, components for demodulating CE, MLI, and user data can be summarized as shown below:
(1) A CE demodulation part composed of the FFT circuit 215-1
(2) An MLI demodulation part 224 composed of the FFT circuit 215-2, the channel compensation circuit 217, the symbol demodulation circuit 218, and the error detection circuit 219
(3) A user data demodulation part 225 composed of the FFT circuit 215-3, the channel compensation circuit 221, the symbol demodulation circuit 222, and the decoder circuit 223

Also, transmission data (user data) is input into the transmitting circuit 210. In the transmitting circuit 210, for example, coding processing, modulation processing, and processing to feedback a channel estimation result signal input from the channel estimation circuit 216 to a base station as information data are performed with respect to the transmission data. Then, the transmission data undergoes digital/analog conversion, and is up-converted into an RF signal by an RF converter 226 and transmitted by a transmitting antenna 227.

Next, a configuration example of a base station apparatus applied to an OFDM/MTPC communication system will be described. As shown in FIG. 19, a base station apparatus 230 has a transmitting circuit 231 and a receiving circuit 232. In the transmitting circuit 231, a modulation level/transmission power designation circuit 233 determines, based on a channel estimation result signal acquired as received data by the receiving circuit 232, transmission power of each sub-carrier for transmitting user data (transmission data) and the modulation level of each sub-carrier for transmitting user data.

An encoder circuit 234 performs processing such as compression coding of user data (transmission data) and addition of error correction code, and a symbol modulation circuit 235 modulates, based on the modulation level of each sub-carrier determined by the modulation level/transmission power designation circuit 233, user data encoded by the encoder circuit 234. A transmission power control circuit 236 regulates an output signal from the symbol modulation circuit 235 to a value determined by the modulation level/transmission power designation circuit 233 for each sub-carrier, and an IFFT circuit 237 performs an inverse Fourier transformation of an output signal of the transmission power control circuit 236 for output.

An MLI generating circuit 238 generates MLI based on the modulation level of each sub-carrier for transmitting user data determined by the modulation level/transmission power designation circuit 233. A symbol modulation circuit 239 modulates MLI generated by the MLI generating circuit 238. An IFFT circuit 240 performs an inverse Fourier transformation of an output signal of the symbol modulation circuit 239 for output.

A CE generating circuit 241 generates a CE and an IFFT circuit 242 performs an inverse Fourier transformation of a CE generated by the CE generating circuit 241 for output.

A multiplexer 243 multiplexes output signals of three IFFT circuits (237, 240, and 242) to match the slot configuration shown in FIG. 17. A digital/analog conversion circuit 244 converts an output of the multiplexer 243 from a digital signal into an analog signal. An analog signal output by the digital/analog conversion circuit 244 is up-converted into an RF signal by an RF converter 245 and transmitted by a transmitting antenna 246.

In the transmitting circuit 231 shown in FIG. 19, components for modulating CE, MLI, and user data can be summarized as shown below:
(1) A CE modulation part 247 composed of the CE generating circuit 241 and the IFFT circuit 242
(2) An MLI modulation part 248 composed of the MLI generating circuit 238, the symbol modulation circuit 239, and the IFFT circuit 240
(3) A user data modulation part 249 composed of the encoder circuit 234, the symbol modulation circuit 235, the transmission power control circuit 236, and the IFFT circuit 237

An RF signal received by a receiving antenna 250 is down-converted by an RF converter 251 and input into the receiving circuit 232. In the receiving circuit 232, for example, analog/digital conversion processing, demultiplexing processing into various signals, and various demodulation processing are performed to output received data (user data).

Non-patent document 1: The Institute of Electronics, Information and Communication Engineers RCS2002-239 "Study on interference reducing technology in a one-cell repetitive OFDM/TDMA system using a sub-carrier adaptive modulation system"

DISCLOSURE OF THE INVENTION

In the OFDM/MTPC system, however, MLI of each slot existing in the same communication frame is all the same. Thus, if demodulation of MLI on the receiving side succeeds once, the MLI whose demodulation has succeeded can be used for demodulation of user data contained in all slots existing in the same communication frame. Conversely, if demodulation of MLI on the receiving side succeeds, MLI contained in slots received thereafter may no longer be needed. That is, if, for example, MLI demodulation is successful when a first slot is received on the receiving side, as shown in FIG. 20, MLI contained in the following second to N-th slots will be unnecessary data. Thus, a transmitting side has caused lower transmission efficiency by continuing to transmit unnecessary MLI.

The present invention has been developed in view of the above circumstances and an object thereof is to provide a wireless communication system that can improve transmission efficiency by stopping transmission of unnecessary MLI.

(1) To achieve the above object, steps shown below have been taken for the present invention. That is, a modulator according to the present invention is a modulator applied to a wireless communication system that conducts wireless communication by a multi-carrier modulation scheme using a communication frame composed of a plurality of slots, comprising a slot generation part generating the slot by multiplexing header information containing at least channel estimation information to estimate channels, modulation level information to notify a receiving side of a modulation level of each sub-carrier, and user data, and a determination part determining whether or not demodulation information to notify that successful demodulation of the modulation level information has been received from the receiving side, wherein, when the determination part determines that the demodulation information has been received, the slot generation part generates, after receiving the demodulation information, slots which do not contain the modulation level information in a relevant communication frame.

Since, as described above, when demodulation information for notifying that demodulation of modulation level information has succeeded is received from the receiving side, slots containing no modulation level information are generated in the relevant communication frame after receiving the demodulation information, no unnecessary modulation level information will be transmitted. Since this eliminates a time occupied by unnecessary modulation level information in a slot, the time can now be used for transmission of user data. For example, a slot length can be shortened by deleting a time occupied by unnecessary modulation level information in a slot to increase the number of slots existing in the same frame, or without changing the slot length, user data can be assigned to the time occupied by unnecessary modulation level information. As a result, transmission efficiency can be improved.

(2) Also, the modulator according to the present invention is characterized in that, when the determination part determines that the demodulation information has been received, the slot generation part, after receiving the demodulation information, generates, after generating n (n is a natural number) slots containing the modulation level information, slots in which the modulation level information is not contained in the relevant communication frame.

Since, as described above, after receiving the demodulation information, the slot generation part generates, after generating n (n is a natural number) slots containing modulation level information, slots containing no modulation level information in the relevant communication frame, processing under a light load can be performed with sufficient lead time. That is, since a transmitting circuit starts transmission processing of slots before receiving demodulation information, it is not easy to make a slot immediately after reception of demodulation information free of modulation level information. Thus, a certain time after reception of demodulation information is preferably allocated to preparations for generating slots containing no modulation level information. Also, since a time required for generating n slots containing modulation level information after receiving demodulation information is allocated to preparations for generating slots containing no modulation level information, time management in slots can be performed.

(3) A modulator according to the present invention is a modulator applied to a wireless communication system that conducts wireless communication by a multi-carrier modulation scheme using a communication frame composed of a plurality of slots, comprising a slot generation part generating the slot by multiplexing header information containing at least channel estimation information to estimate channels, modulation level information to notify a receiving side of a modulation level of each sub-carrier, and user data and a slot number information generation part that estimates the number of slots in which the modulation level information is to be contained and generates slot number information to notify the receiving side of the estimated number of slots, wherein the slot generation part generates, after generating the estimated number of slots by adding the slot number information to the modulation level information, slots in which the modulation level information is not contained in a relevant communication frame.

Since, as described above, after estimating the number of slots to contain modulation level information and generating the estimated number of slots by adding slot number information to the modulation level information, slots in which no modulation level information is contained in a relevant communication frame are generated, no unnecessary modulation level information will be transmitted. Since this eliminates a time occupied by unnecessary modulation level information in a slot, the time can now be used for transmission of user data. As a result, transmission efficiency can be improved. Also, since the number of slots containing modulation level information is transmitted together with the modulation level information, processing on a transmitting side will not be affected by whether demodulation of modulation level information is successful on the receiving side and, on the transmitting side, processing to determine whether or not demodulation information to notify the transmitting side that demodulation of modulation level information has succeeded is received from the receiving side is made unnecessary, thus enabling simplification of processing on the transmitting side. On the receiving side, on the other hand, if demodulation of modulation level information and slot number information is successful, the number of slots in which modulation level information is contained can be grasped. This enables the receiving side, after successful demodulation of modulation level information and slot number information, to ignore modulation level information if a slot in which modulation level information and slot number information are contained is received and to demodulate user data by using demodulated modulation level information if a slot in which no modulation level information is contained is received. This makes processing to notify the transmitting side that demodulation of modulation level information has succeeded unnecessary, enabling simplification of processing on the receiving side.

(4) Also, the modulator according to the present invention is characterized in that the slot number information generation part estimates the number of slots in which signal power necessary for demodulating the modulation level information can be obtained based on channel estimation information.

Since, as described above, the number of slots in which signal power necessary for demodulating the modulation level information can be obtained is estimated based on channel estimation information, modulation level information can reliably be demodulated on the receiving side. Also, processing to determine whether demodulation information to notify the transmitting side that demodulation of modulation level information has succeeded is received from the receiving side is made unnecessary, enabling simplification of processing on the transmitting side.

(5) Also, the modulator according to the present invention is characterized in that the slot number information is information all representing the same numeric value.

Since, as described above, the slot number information is all information that represents the same numeric value, the number of slots containing modulation level information can be grasped on the receiving side by counting the number of slots received from the start of a communication frame and it becomes possible to clearly distinguish between slots containing modulation level information and those not containing modulation level information.

(6) Also, the modulator according to the present invention is characterized in that the slot number information is information representing a remaining number of times of transmission of slots containing the modulation level information.

Since, as described above, slot number information is information representing a remaining number of times of transmission of slots containing modulation level information, even though a signal cannot be detected by the receiving circuit in one of slots containing modulation level information on the receiving side and a slot is missed, it is still possible to grasp how many slots containing modulation level information remain to be transmitted and in which stage slots containing no modulation level information will be transmitted without counting the number of received slots from the start of a communication frame if demodulation of modulation level information and slot number information in other slots is successful. This enables the receiving side to prevent reception of a slot containing no modulation level information as one containing modulation level information by mistake.

(7) Also, the modulator according to the present invention is characterized in that the slot generation part shortens a slot length by deleting a time allocated to the modulation level information in a slot when generating the slot without containing the modulation level information and, as a result of shortened slot length, slots having a shortened slot length without containing the modulation level information are further generated in accordance with an idle time generated in the communication frame.

Since, as described above, the slot length is shortened by deleting a time allocated to modulation level information in a slot when generating slots containing no modulation level information and, as a result of shortened slot length, slots having a shortened slot length without containing modulation level information are further generated in accordance with an idle time generated in the communication frame, the number of slots that can exist in a communication frame of the same time length as a conventional communication frame can be increased. Since this enables transmission of more user data, improvement of transmission efficiency can be sought.

(8) Also, the modulator according to the present invention is characterized in that the slot generation part generates slots that do not contain the modulation level information without changing the slot length by allocating, instead of the modulation level information, the user data to a time to which the modulation level information is allocated in the slot.

Since, as described above, slots are generated that do not contain modulation level information without changing the slot length by allocating, instead of the modulation level information, user data to a time to which the modulation level information is allocated in a slot, the proportion of user data in a slot of the same time length as a conventional slot can be increased. Since this enables transmission of more user data, improvement of transmission efficiency can be sought. The present invention is suitable to a system like TDMA (Time Division Multiple Access), for example, in which the slot length must be maintained constant.

(9) A demodulator according to the present invention is a demodulator applied to a wireless communication system that conducts wireless communication by a multi-carrier modulation level using a communication frame composed of a plurality of slots containing at least modulation level information to notify a receiving side of a modulation method of each sub-carrier and user data, comprising a modulation scheme information demodulation part that extracts the modulation scheme information from a received slot and demodulates the extracted modulation scheme information, a demodulation information generation part that determines whether or not demodulation of the modulation scheme information has succeeded and, when the demodulation has been successful, generates demodulation information to notify a transmitting side of successful demodulation of the modulation scheme information, and a user data demodulation part that, after the demodulation information is generated, uses the successfully demodulated modulation scheme information to demodulate each sub-carrier corresponding to the user data in each slot existing in the same communication frame.

Since, as described above, when demodulation of modulation level information has been successful, demodulation information to notify the transmitting side of successful demodulation of the modulation level information is generated and, after the demodulation information is generated, the successfully demodulated modulation level information is used to demodulate each sub-carrier corresponding to user data in each slot existing in the same communication frame, modulation level information is no longer needed on the receiving side after demodulation of the modulation level information has succeeded. Then, with transmission of demodulation information to the transmitting side, slots containing no modulation level information can be generated on the transmitting side after receiving the demodulation information. This eliminates transmission of unnecessary modulation level information and thus improvement of transmission efficiency can be sought.

(10) A demodulator according to the present invention is a demodulator applied to a wireless communication system that conducts wireless communication by a multi-carrier modulation level using a communication frame composed of a plurality of slots containing at least modulation level information to notify the receiving side of the modulation level of each sub-carrier and user data, comprising an extraction part to extract the modulation level information and slot number information added to the modulation level information to indicate the number of slots containing the modulation level information existing in the communication frame, a modulation level/slot number information demodulation part to demodulate the extracted modulation level information and slot number information, and a user data demodulation part that determines whether or not demodulation of the modulation level information and slot number information has succeeded and, when the demodulation is successful, extracts the number of slots to identify a last slot containing the modulation level information and slot number information based on the extracted number of slots, and, uses the successfully demodulated modulation level information to demodulate each sub-carrier corresponding to the user data of each slot existing in the same communication frame after slots following the identified slot.

Since, as described above, modulation level information and slot number information are extracted from a received slot and, when demodulation of the modulation level information and slot number information is successful, the number of slots is extracted to identify the last slot containing modulation level information and slot number information based on the extracted number of slots, it becomes possible to clearly distinguish slots containing modulation level information and slot number information and those not containing modulation level information and slot number information. Also, since, the successfully demodulated modulation level information is used to demodulate each sub-carrier corresponding to user data of each slot existing in the same communication frame after slots following the identified slot, modulation level information is no longer needed on the receiving side after demodulation of modulation level information and slot number information has succeeded. Then, since slots containing no modulation level information in the communication frame are generated on the transmitting side after generating an estimated number of slots by adding slot number information to the modulation level information, transmission of unnecessary modulation level information is eliminated. Since this eliminates a time occupied by unnecessary modulation level information in a slot, the time can now be used for transmission of user data. As a result, improvement of transmission efficiency can be sought.

(11) A base station according to the present invention comprises any of the above-described modulators and (12) a mobile station according to the present invention comprises any of the above-described demodulators. (13) A wireless communication system according to the present invention is comprised of the base station and mobile station.

Since, with a configuration described above, transmission of unnecessary modulation level information is eliminated, a time occupied by unnecessary modulation level information in a slot is eliminated and the time can now be used for transmission of user data. As a result, improvement of transmission efficiency can be sought.

Since, according to the present invention, transmission of unnecessary modulation level information is eliminated, a time occupied by unnecessary modulation level information in a slot is eliminated and the time can now be used for transmission of user data. As a result, improvement of transmission efficiency can be sought.

BEST MODES FOR CARRYING OUT THE INVENTION (First Embodiment)

Figure 1:
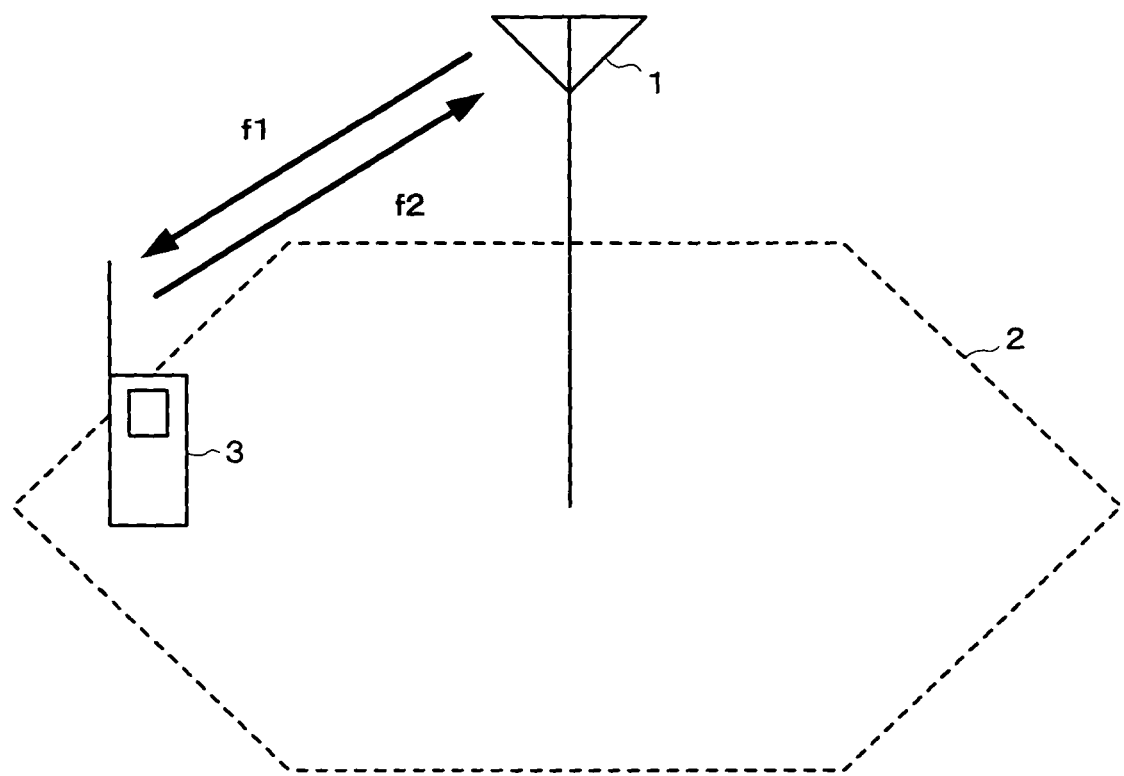
FIG. 1 is a diagram showing an overview of a wireless communication system according to a first embodiment.

FIG. 1 is a diagram showing an overview of a wireless communication system according to a first embodiment. A base station apparatus 1 conducts bi-directional communication with a mobile station apparatus 3 existing in a cell 2 by FDD (Frequency Division Duplex). A frequency f1 is used for transmission (downlink) from the base station apparatus 1 to the mobile station apparatus 3 using the MTPC system. A frequency f2 is used for transmission (uplink) from the mobile station apparatus 3 to the base station apparatus 1. A communication method and a frame format of the uplink are not particularly limited and a conventionally known communication method and frame format can be used.

In the wireless communication system according to the first embodiment, if the mobile station apparatus as a receiving side succeeds in demodulation of MLI, the base station apparatus as a transmitting side stops transmission of MLI. To realize this operation in the wireless communication system, if demodulation of MLI is successful, the mobile station apparatus transmits ACK (ACKnowledgement) as demodulation information indicating successful demodulation to the base station apparatus and, hereafter user data is demodulated assuming that there is no MLI in slots existing in the same communication frame. When demodulating user data, MLI whose demodulation has already succeeded is used. The above overview will be described with reference to FIG. 2.

Figure 2:
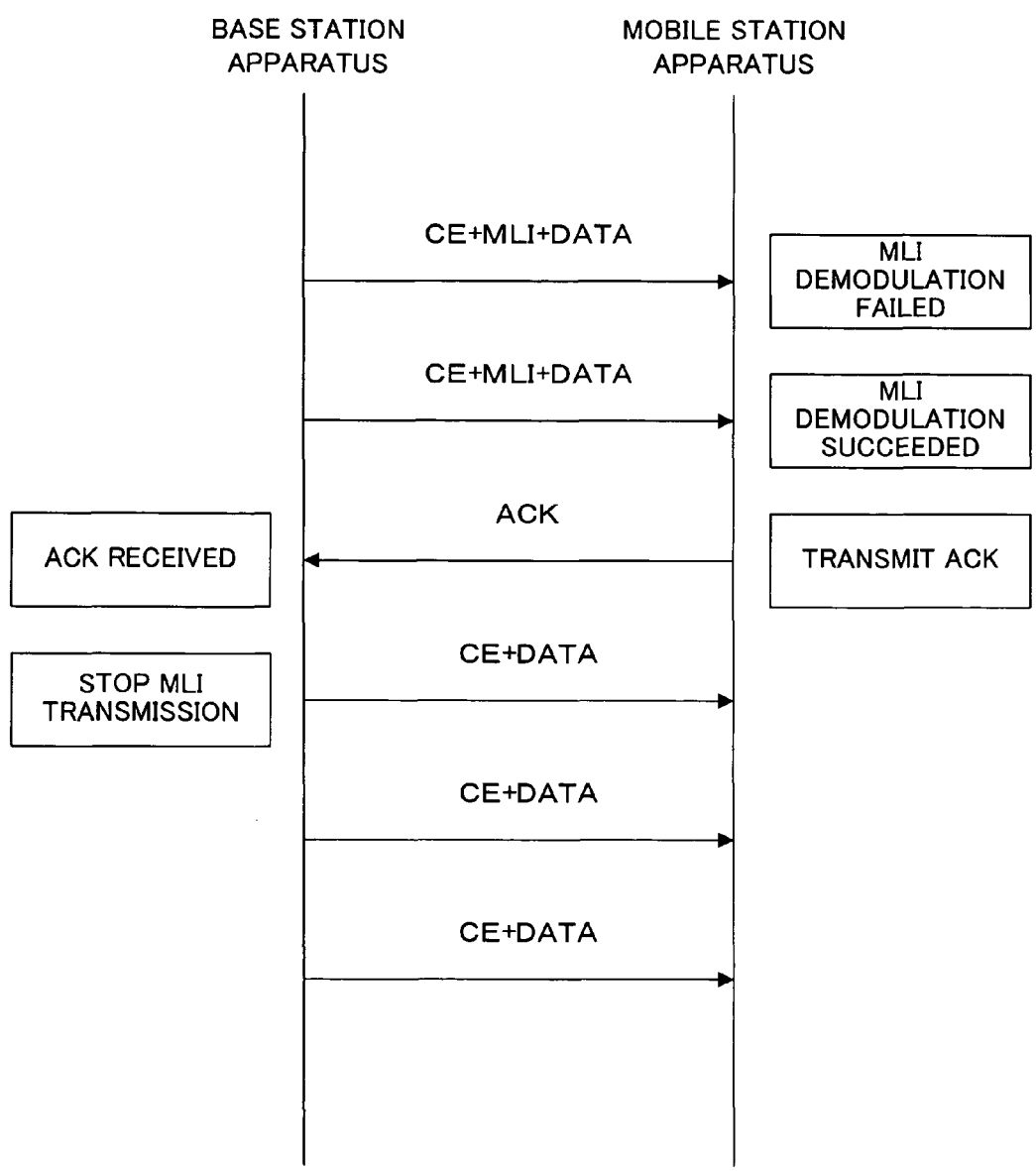
FIG. 2 is a diagram showing a data transmission sequence between a base station apparatus and a mobile station apparatus in the wireless communication system according to the first embodiment.

FIG. 2 is a diagram showing a data transmission sequence between the base station apparatus and the mobile station apparatus in the wireless communication system according to the first embodiment. In FIG. 2, time is assumed to pass downward from the top of the page. The base station apparatus transmits a first slot containing CE, MLI, and user data to the mobile station apparatus. Since, if the mobile station apparatus fails to demodulate MLI in the first slot, the base station apparatus has not received ACK, the base station apparatus transmits a second slot also by containing CE, MLI, and user data in the second slot.

Next, the mobile station apparatus succeeds in demodulation of MLI with the second slot. Thus, the mobile station apparatus transmits ACK to the base station apparatus to notify that demodulation of MLI has succeeded. After receiving ACK, the base station apparatus stops transmission of MLI because there is no need to transmit MLI till the next communication frame. That is, in the relevant communication frame, slots containing no MLI are transmitted to the mobile station apparatus. The mobile station apparatus receives slots under the assumption that slots received after transmitting ACK contain only CE and user data and do not contain MLI to demodulate user data. Next, the configuration of the mobile station apparatus and the base station apparatus to provide such functions will be described.

Figure 3:
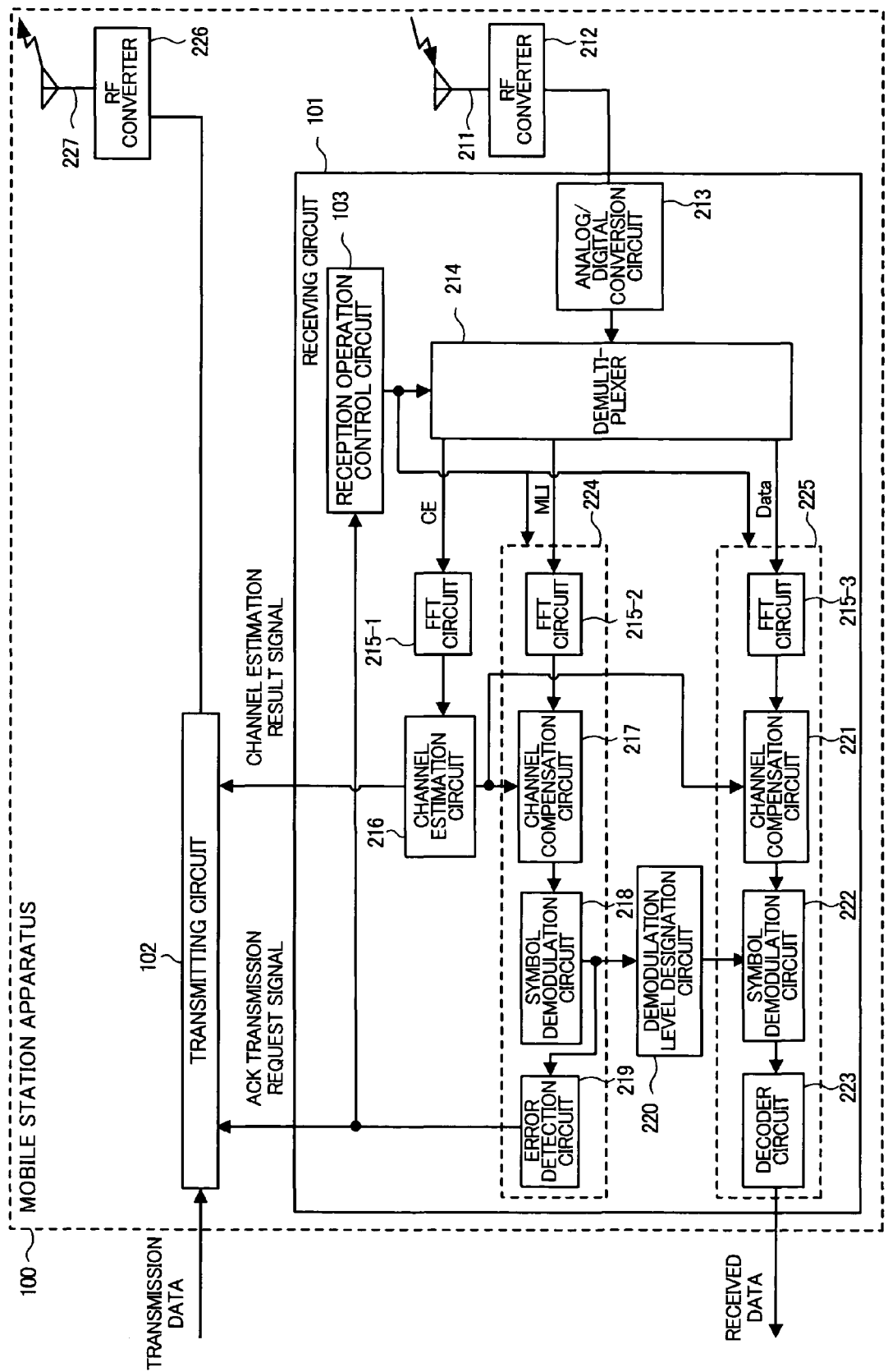
FIG. 3 is a block diagram showing a configuration of the mobile station apparatus according to the first embodiment.

FIG. 3 is a block diagram showing the configuration of the mobile station apparatus according to the first embodiment. The same reference numerals are attached to blocks with the same function as those of a conventional mobile station apparatus shown in FIG. 18 for description. As shown in FIG. 3, a mobile station apparatus 100 has a receiving circuit 101 and a transmitting circuit 102. An RF signal received by the receiving antenna 211 is down-converted by the RF converter 212 and input into the receiving circuit 101. An output signal of the RF converter 212 input into the receiving circuit 101 is input into the analog/digital conversion circuit 213 to convert the signal from an analog signal into a digital signal. A digital signal output by the analog/digital conversion circuit 213 is input into the demultiplexer 214 to demultiplex and output the signal to the CE part 205, the MLI symbol part 206, and the user data symbol part 204 in accordance with the slot configuration shown in FIG. 17.

The Fourier transformation circuit (FFT circuit) 215-1 performs a Fourier transformation of an output signal of the demultiplexer 214 to reproduce a received CE. The channel estimation circuit 216 compares a received CE input from the Fourier transformation circuit 215-1 and the reference CE to estimate channel characteristics.

The Fourier transformation circuit (FFT) 215-2 performs a Fourier transformation of an output signal of the demultiplexer 214 to reproduce a received MLI symbol. The channel compensation circuit 217 makes channel compensation for a reproduced received MLI symbol based on an estimation result of the channel estimation circuit 216. The symbol demodulation circuit 218 demodulates MLI from the received MLI symbol for which channel compensation has been made by the channel compensation circuit 217.

The error detection circuit 219 detects errors from an output signal of the symbol demodulation circuit 218 using error detecting code and the like. Then, if no error is detected in the output signal of the symbol demodulation circuit 218, the error detection circuit 219 outputs a signal to request transmission of ACK as demodulation information indicating successful demodulation of MLI to the transmitting circuit 102 and the reception operation control circuit 103.

The demodulation level designation circuit 220 designates a demodulation level of each sub-carrier of user data based on the demodulated MLI.

The Fourier transformation circuit (FFT) 215-3 performs a Fourier transformation of an output signal of the demultiplexer 214 to reproduce a received user data. The channel compensation circuit 221 makes channel compensation for a reproduced received user data symbol based on an estimation result of the channel estimation circuit 216. The symbol demodulation circuit 222 demodulates the received user data symbol for which channel compensation has been made by the channel compensation circuit 221 by a demodulation level of the user data symbol part of each sub-carrier designated by the demodulation level designation circuit 220. The decoder circuit 223 performs error correction and decompression processing of encoded user data demodulated by the symbol demodulation circuit 222 to decode user data.

In the receiving circuit 101 shown in FIG. 3, components for demodulating CE, MLI, and user data can be summarized as shown below:
(1) The CE demodulation part composed of the FFT circuit 215-1
(2) The MLI demodulation part 224 composed of the FFT circuit 215-2, the channel compensation circuit 217, the symbol demodulation circuit 218, and the error detection circuit 219
(3) The user data demodulation part 225 composed of the FFT circuit 215-3, the channel compensation circuit 221, the symbol demodulation circuit 222, and the decoder circuit 223

The reception operation control circuit 103 controls, based on a signal to request transmission of ACK input from the error detection circuit 219, operations of the MLI demodulation part 224, the user data demodulation part 225, and the demultiplexer 214 so that slots containing no MLI are received.

In the mobile station apparatus 100, transmission data (user data) is input into the transmitting circuit 102. In the transmitting circuit 102, for example, coding processing, modulation processing, and processing to feedback a channel estimation result signal input from the channel estimation circuit 216 to a base station as information data are performed with respect to the transmission data. Then, the transmission data undergoes digital/analog conversion, and is up-converted into an RF signal by the RF converter 226 and transmitted by the transmitting antenna 227.

Further, upon arrival of a signal to request transmission of ACK, the transmitting circuit 102 generates an ACK signal and then transmits the ACK signal.

Figure 4:
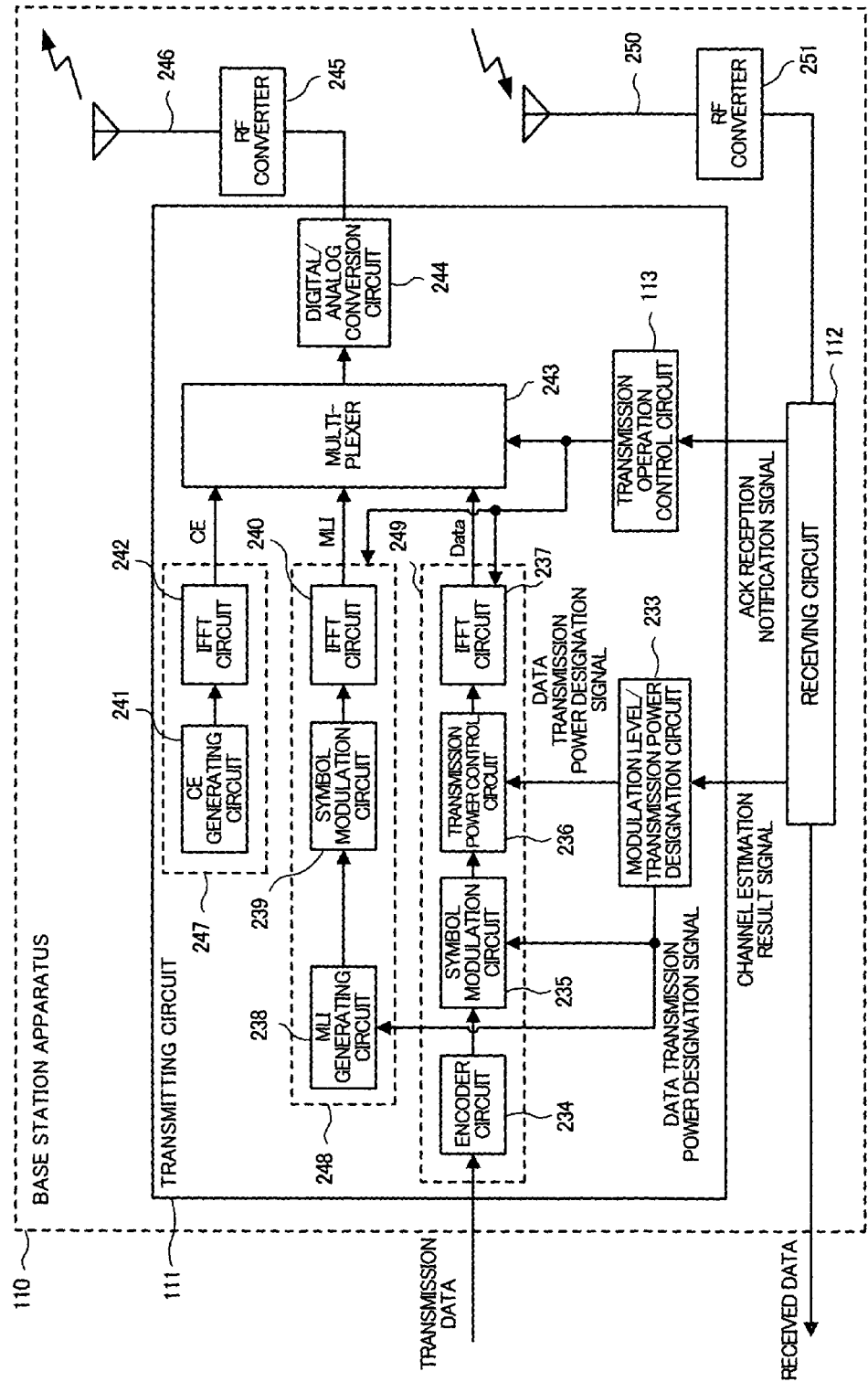
FIG. 4 is a block diagram showing the configuration of the base station apparatus according to the first embodiment.
Figure 19:
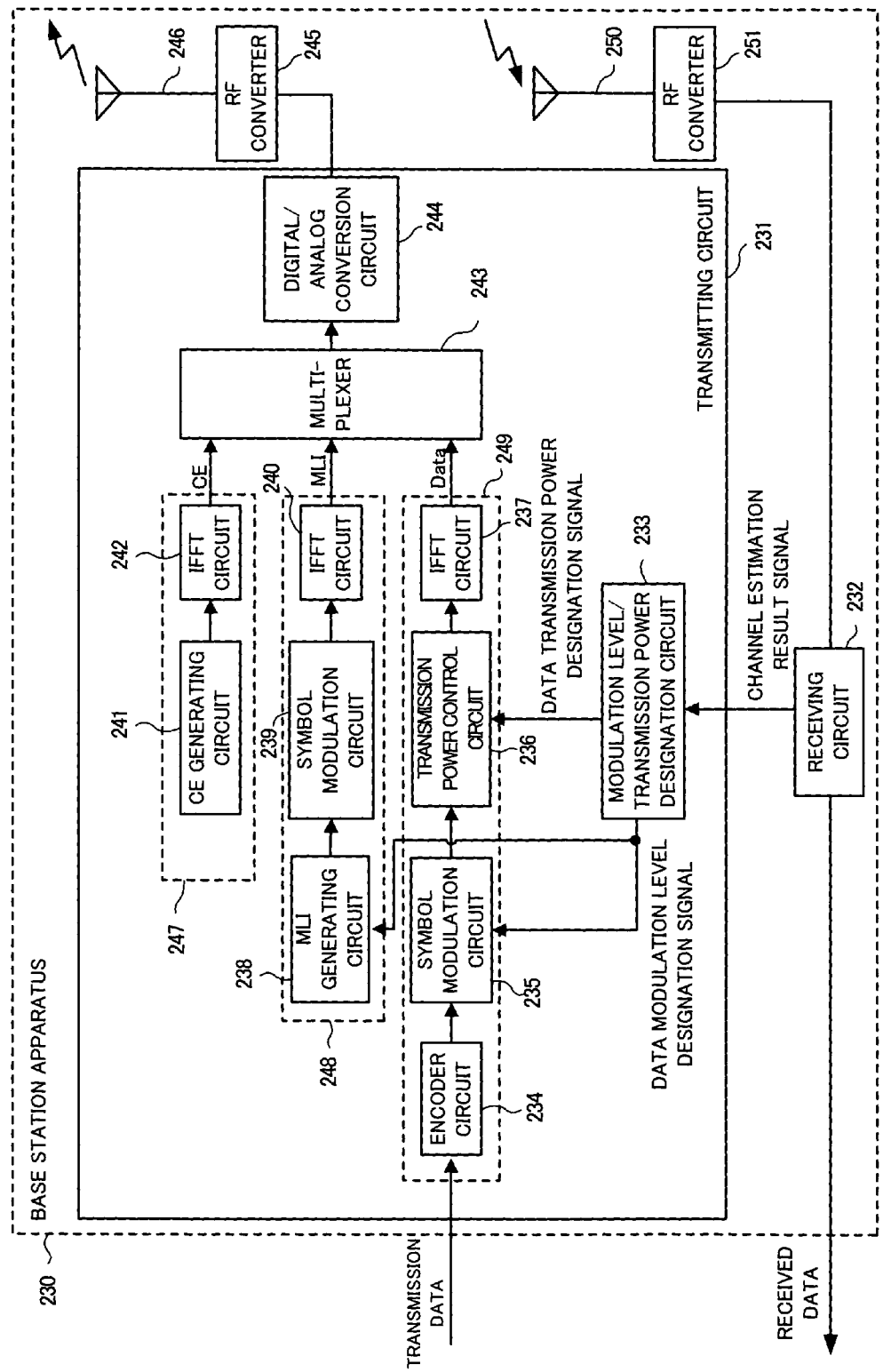
FIG. 19 is a block diagram showing a configuration example of a base station apparatus applied to the OFDM/MTPC communication system.
Figure 20:
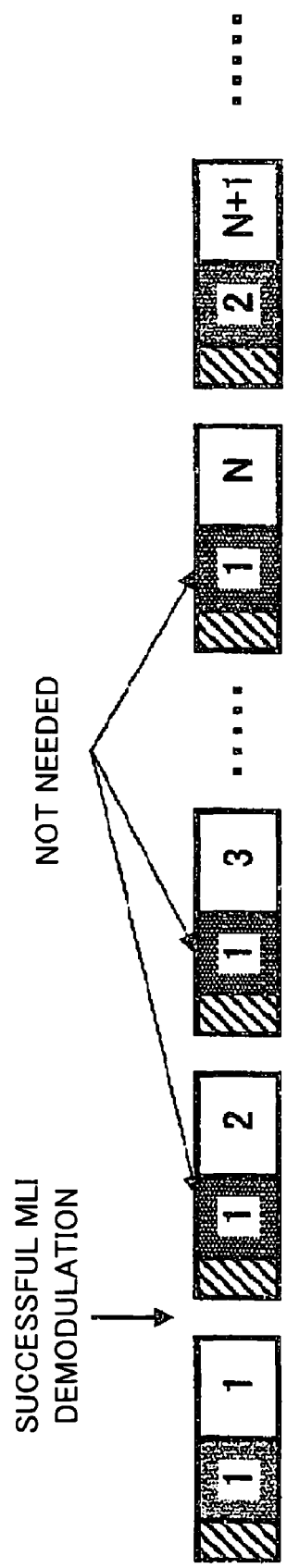
FIG. 20 shows an appearance of a slot after successful demodulation of MLI.

Next, the configuration of the base station apparatus according to the first embodiment will be described with reference to FIG. 4. The same reference numerals are attached to blocks with the same function as those of a conventional base station apparatus shown in FIG. 19 for description. As shown in FIG. 4, a base station apparatus 110 has a transmitting circuit 111 and a receiving circuit 112. In the transmitting circuit 111, the modulation level/transmission power designation circuit 233 determines, based on a channel estimation result signal acquired as received data by the receiving circuit 112, transmission power of each sub-carrier for transmitting user data (transmission data) and the modulation level of each sub-carrier for transmitting user data. The encoder circuit 234 performs processing such as compression coding of user data (transmission data) and addition of error correction code, and the symbol modulation circuit 235 modulates, based on the modulation level of each sub-carrier determined by the modulation level/transmission power designation circuit 233, user data encoded by the encoder circuit 234. The transmission power control circuit 236 regulates an output signal from the symbol modulation circuit 235 to a value determined by the modulation level/transmission power designation circuit 233 for each sub-carrier, and the IFFT circuit 237 performs an inverse Fourier transformation of an output signal of the transmission power control circuit 236 for output.

The MLI generating circuit 238 generates MLI based on the modulation level of each sub-carrier for transmitting user data determined by the modulation level/transmission power designation circuit 233. The symbol modulation circuit 239 modulates MLI generated by the MLI generating circuit 238. The IFFT circuit 240 performs an inverse Fourier transformation of an output signal of the symbol modulation circuit 239 for output.

The CE generating circuit 241 generates a CE and the IFFT circuit 242 performs an inverse Fourier transformation of a CE generated by the CE generating circuit 241 for output.

In the transmitting circuit 111 shown in FIG. 4, components for modulating CE, MLI, and user data can be summarized as shown below:
(1) The CE modulation part 247 composed of the CE generating circuit 241 and the IFFT circuit 242
(2) The MLI modulation part 248 composed of the MLI generating circuit 238, the symbol modulation circuit 239, and the IFFT circuit 240
(3) The user data modulation part 249 composed of the encoder circuit 234, the symbol modulation circuit 235, the transmission power control circuit 236, and the IFFT circuit 237

Figure 17:
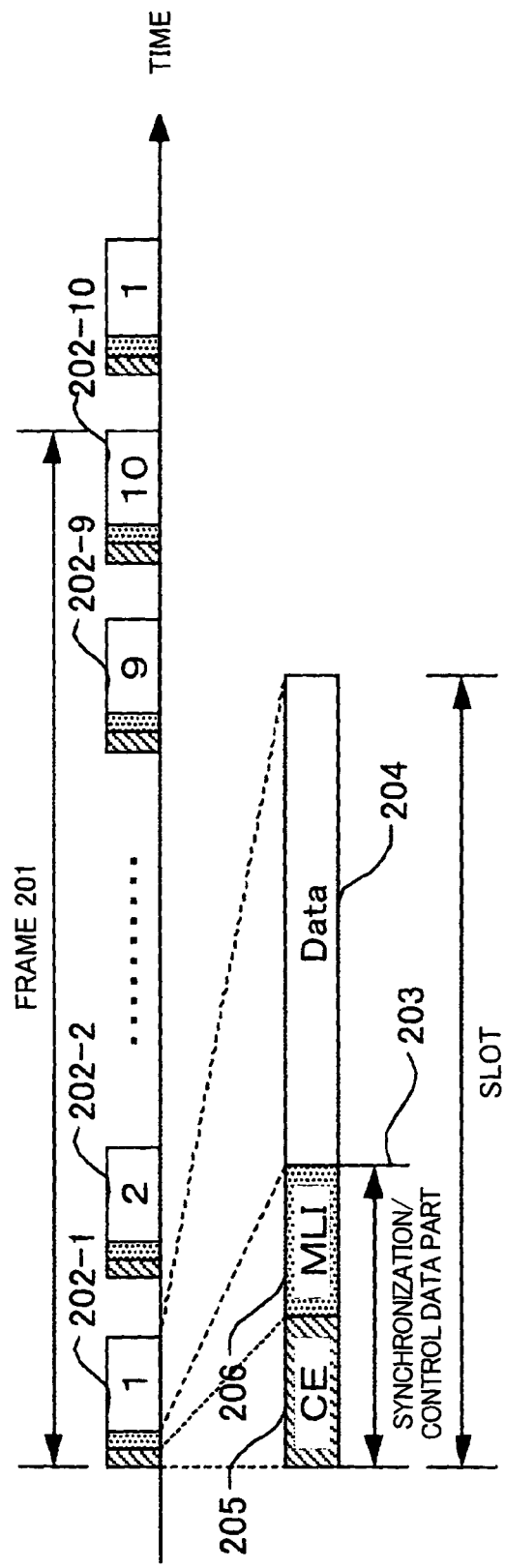
FIG. 17 is a diagram showing the frame format in the orthogonal frequency division multiple system using the multi-level transmission power control system.
Figure 18:
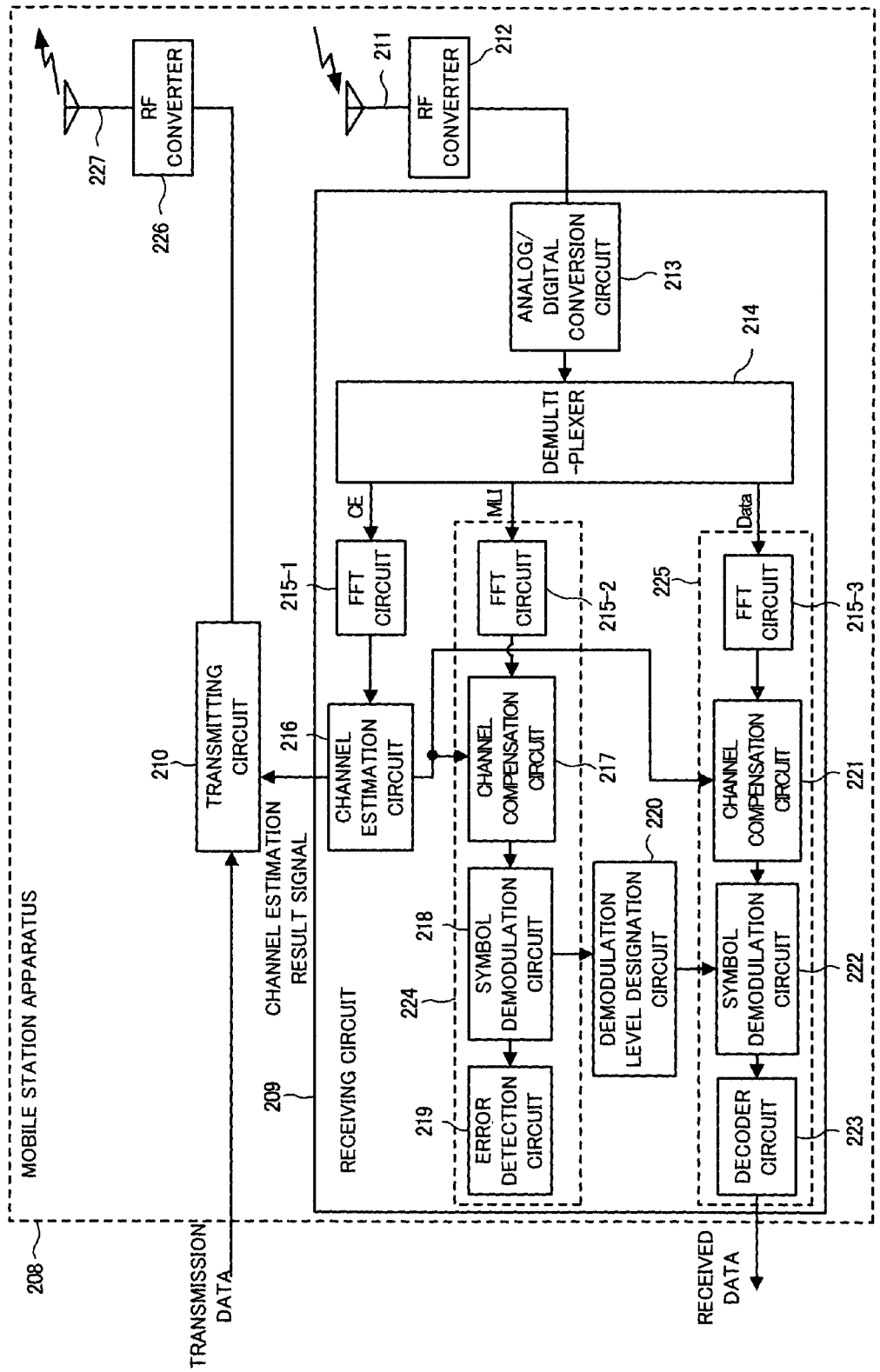
FIG. 18 is a block diagram showing a configuration example of a mobile station apparatus applied to an OFDM/MTPC communication system.

The multiplexer 243 multiplexes output signals of three IFFT circuits (237, 240, and 242) to match the slot configuration shown in FIG. 17.

A transmission operation control circuit 113 controls, based on a signal to notify that ACK input from the receiving circuit 112 has been received, operation timing of the MLI modulation part 248, the user data modulation part 249, and the multiplexer 243 so that slots containing no MLI are generated.

The digital/analog conversion circuit 244 converts an output of the multiplexer 243 from a digital signal into an analog signal. An analog signal output by the digital/analog conversion circuit 244 is up-converted into an RF signal by the RF converter 245 and transmitted by the transmitting antenna 246.

An RF signal received by the receiving antenna 250 is down-converted by the RF converter 251 and input into the receiving circuit 112. In the receiving circuit 112, for example, analog/digital conversion processing, demultiplexing processing into various signals, and various demodulation processing are performed to output received data (user data). Also, in the receiving circuit 112, ACK contained in an RF signal received by the receiving antenna 250 is demodulated and output to the transmission operation control circuit 113 in the transmitting circuit 111. Further, in a receiving circuit 132, channel conditions are estimated based on a received signal and an estimation result signal is output to a transmitting circuit 131.

Figure 5:
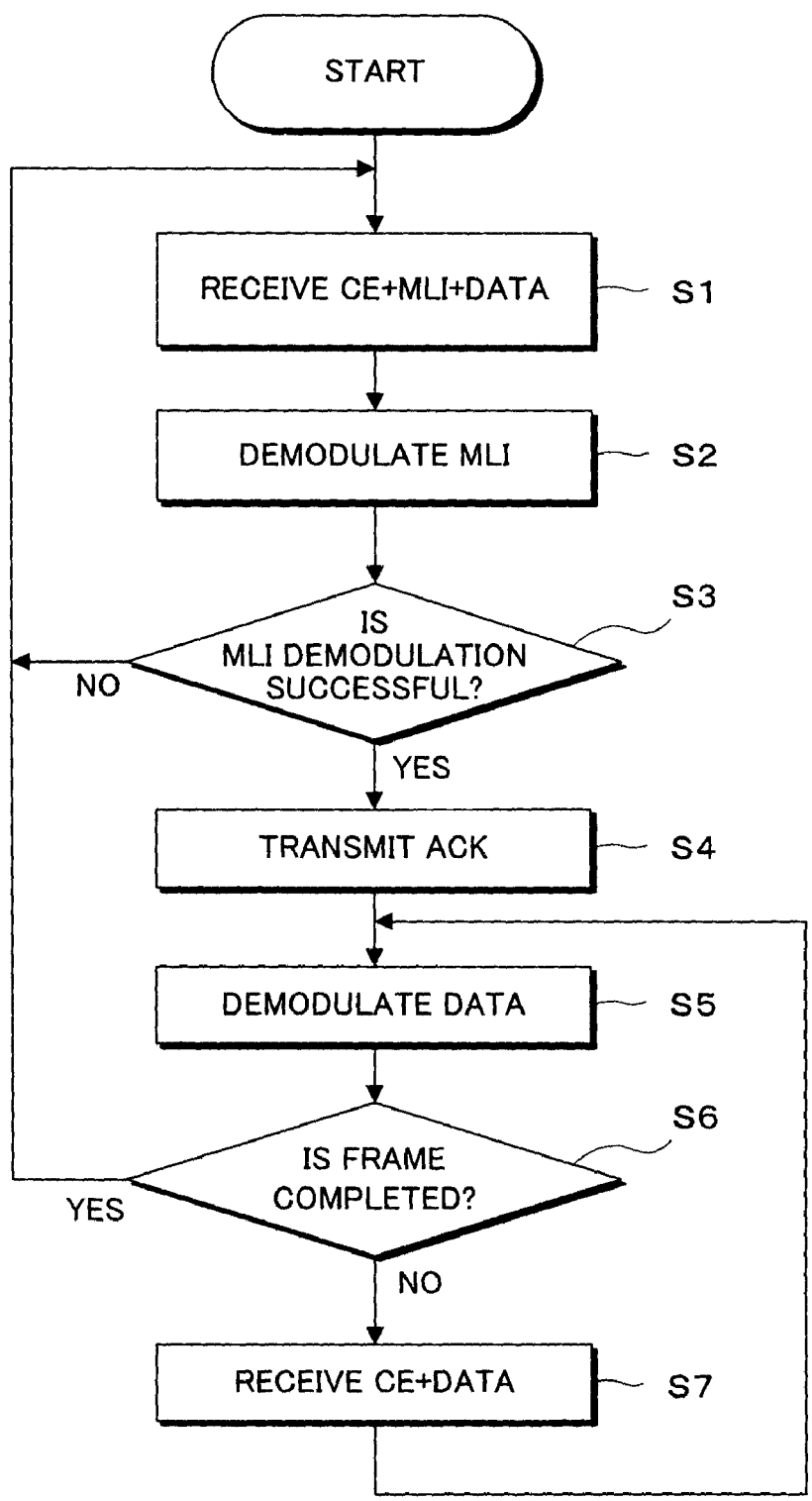
FIG. 5 is a flow chart showing an operation of the mobile station apparatus according to the first embodiment.

Next, an operation of the mobile station apparatus according to the first embodiment constructed as described above will be described. Reference is made to a flow chart shown in FIG. 5 for the following description. In the mobile station apparatus 100, when the receiving circuit 101 receives a slot containing CE, MLI, and user data (step S1), the MLI demodulation part 224 demodulates MLI (step S2). The MLI contains error checking bits and the like, and the error detection circuit 219 in the MLI demodulation part 224 determines whether or not demodulation of MLI has succeeded, that is, no error is detected (step S3). If demodulation of MLI fails, that is, an error is detected, preparations for receiving the next slot again are made after going back to step S1.

If, on the other hand, in step S3, demodulation of MLI is successful, that is, no error is detected, the error detection circuit 219 outputs a signal to request transmission of ACK to notify the base station apparatus that demodulation of MLI has succeeded to the transmitting circuit 102 and the reception operation control circuit 103. The transmitting circuit 102 transmits ACK to the base station apparatus (step S4) and the reception operation control circuit 103 controls, based on a signal to request transmission of ACK, operations of the MLI demodulation part 224, the user data demodulation part 225, and the demultiplexer 214 so that slots containing no MLI are received.

Then, user data is demodulated based on MLI demodulated in step S2 (step S5) and whether the relevant communication frame is completed is determined (step S6). If the relevant communication frame is not completed, slots containing no MLI, that is, slots containing CE and user data transmitted successively by the base station apparatus are received (step S7) and user data received in step S7 is demodulated using MLI demodulated in step S2 (step S5). Operations of step S5 to step S7 are repeated until the relevant communication frame is completed. That is, between a time when demodulation of MLI succeeds and a time when the relevant communication frame is completed, demodulation is performed under the assumption that received slots contain only CE and user data. If, in step S6, the relevant communication frame is completed, reception is performed after going back to step S1 under the assumption that slots containing MLI will be transmitted again in the next communication frame.

Figure 6:
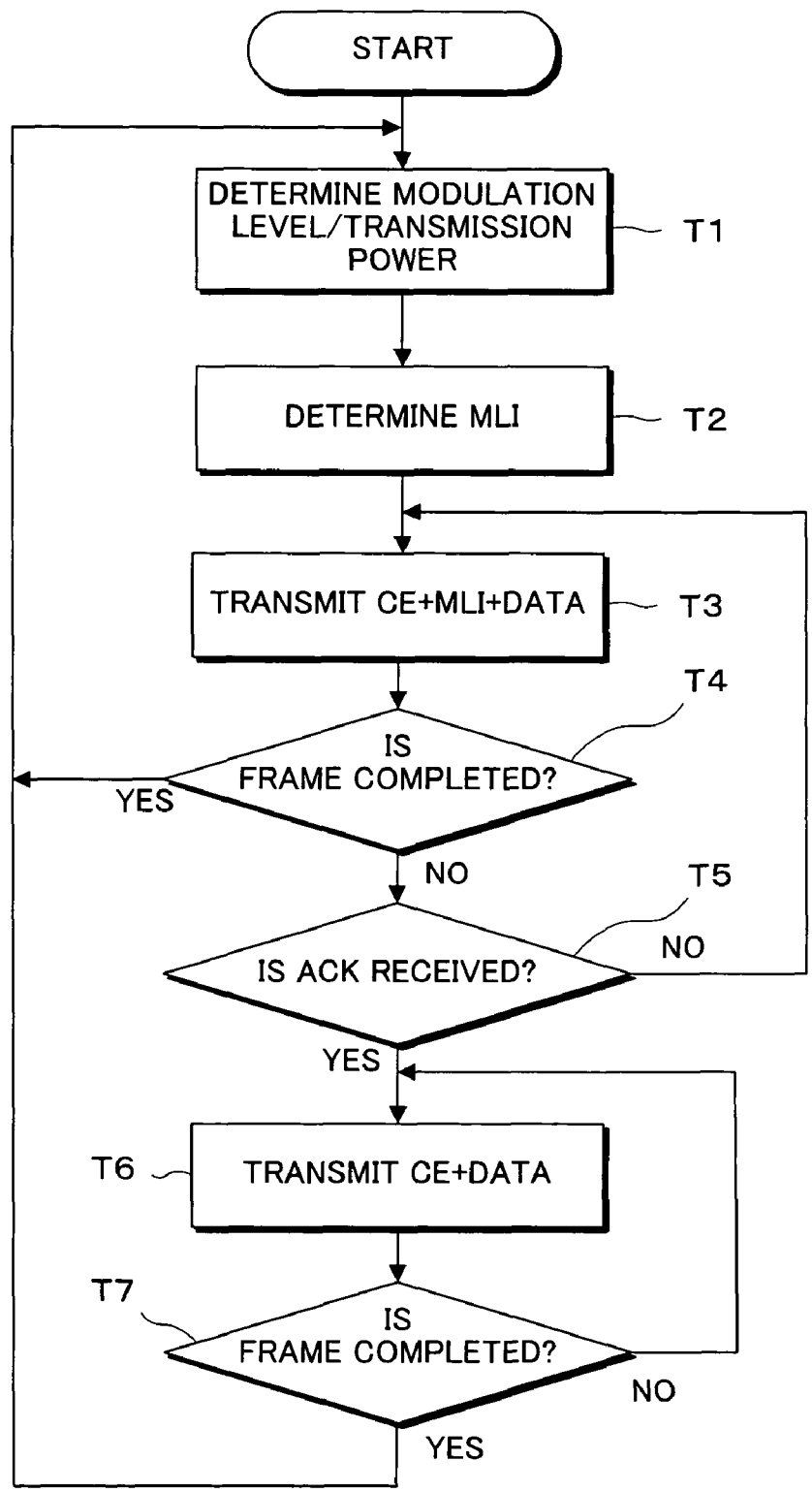
FIG. 6 is a flow chart showing the operation of the base station apparatus according to the first embodiment.

Next, an operation of the base station apparatus according to the first embodiment will be described with reference to a flow chart shown in FIG. 6. In the base station apparatus 110, the transmitting circuit 111 determines the modulation level and transmission power (step T1). That is, it is assumed in the MTPC system that the base station apparatus 110 grasps a channel estimation result based on a feedback from the mobile station apparatus 100 and the like. The transmitting circuit 111 determines the modulation level and transmission power for each sub-carrier based on a channel estimation result so that SNR required for the mobile station apparatus 100 is obtained. At the same time, MLI generated by the MLI generating circuit 238 is also determined (step T2). Next, slots containing CE, the above determined MLI, and user data are transmitted (step T3) and whether the relevant communication frame is completed is determined (step T4).

If the relevant communication frame is completed, the next step is to return to step T1, and if the relevant communication frame is not completed, whether ACK has been received is judged (step T5). If no ACK has been received, the next step is to go to step T3 to transmit slots containing CE, MLI, and user data again. If, on the other hand, in step T5, ACK is received, slots containing no MLI, that is, slots containing only CE and user data are transmitted (step T6). Next, whether the relevant communication frame is completed is determined (step T7). If not completed, the next step is to go to step T6 to repeat operations of step T6 and step T7 until the relevant communication frame is completed. If, on the other hand, in step T6, the relevant communication frame is completed, the next step is to return to step T1 to determine MLI again based on a channel estimation result and to start transmission of slots containing MLI.

Since, with the wireless communication system according to the first embodiment, as described above, transmission of unnecessary MLI is eliminated, a time occupied by unnecessary MLI in a slot is eliminated and the time can now be used for transmission of user data. As a result, improvement of transmission efficiency can be sought.

(Second Embodiment)

Figure 7:
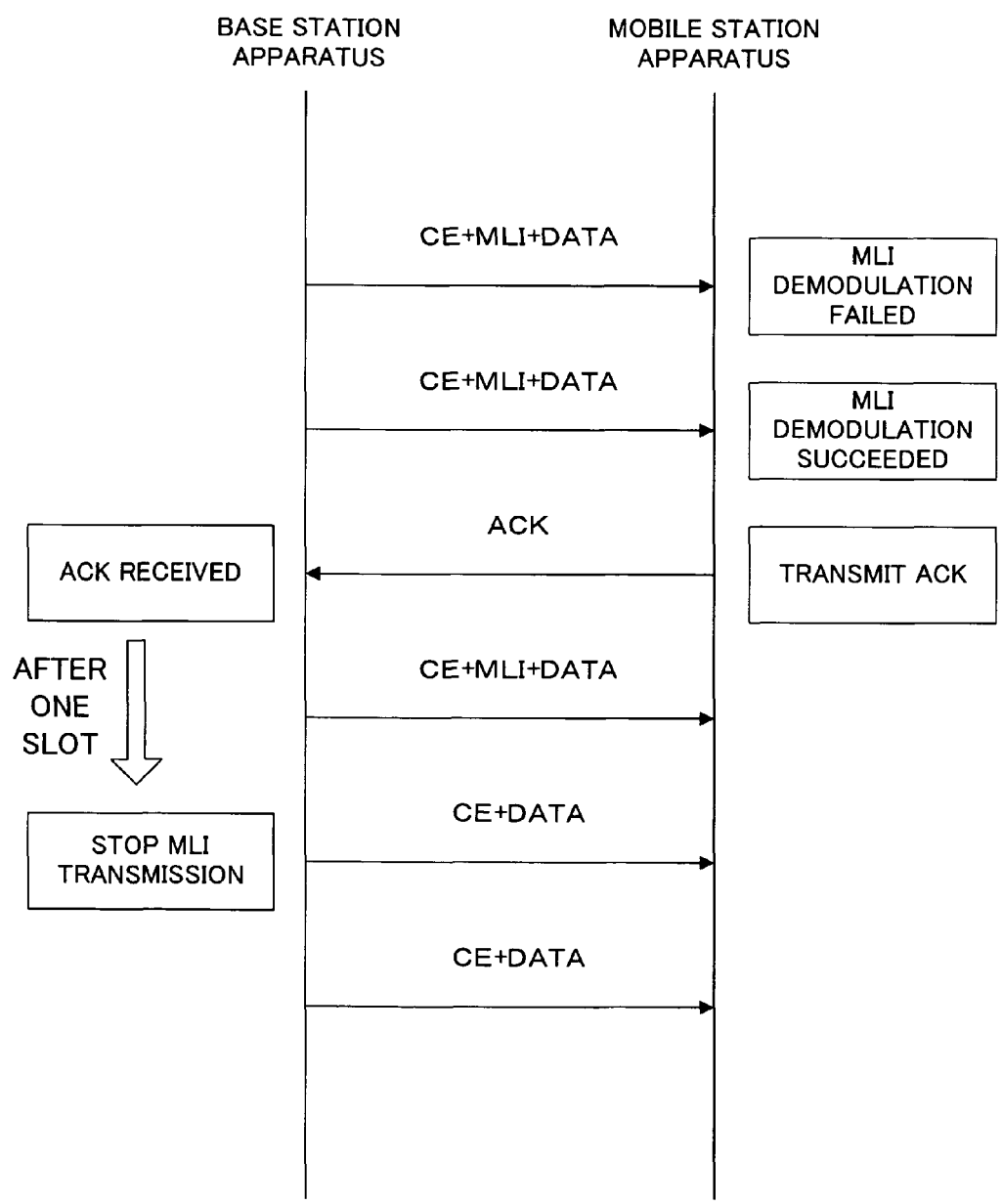
FIG. 7 is a diagram showing the data transmission sequence between a base station apparatus and a mobile station apparatus in a wireless communication system according to a second embodiment.

Next, a wireless communication system according to a second embodiment will be described. FIG. 7 is a diagram showing a data transmission sequence between a base station apparatus and a mobile station apparatus in the wireless communication system according to the second embodiment. In FIG. 7, like FIG. 2, time is assumed to pass downward from the top of the page. The base station apparatus transmits the first slot containing CE, MLI, and user data to the mobile station apparatus. Since, if the mobile station apparatus fails to demodulate MLI in the first slot, the base station apparatus has not received ACK, the base station apparatus transmits the second slot also by containing CE, MLI, and user data in the second slot.

Next, the mobile station apparatus succeeds in demodulation of MLI with the second slot. Thus, the mobile station apparatus transmits ACK to the base station apparatus to notify that demodulation of MLI has succeeded. After receiving ACK, the base station apparatus stops transmission of MLI because there is no need to transmit MLI till the next communication frame. That is, in the relevant communication frame, slots containing no MLI are transmitted to the mobile station apparatus.

Here, in the second embodiment, the base station apparatus shall transmit slots containing no MLI after transmitting, for example, one slot upon arrival of ACK. This is because of a situation that, in the base station apparatus, processing to transmit the next slot is already under way when ACK is received and thus it is not easy to stop transmission of MLI with a slot immediately after reception of ACK.

As shown in FIG. 7, because demodulation of MLI has succeeded with the second slot, the mobile station apparatus transmits ACK to the base station apparatus. Since the base station apparatus has already started processing to transmit a third slot containing MLI when ACK is received, the base station apparatus transmits the third slot containing MLI as it is. Then, as a fourth slot, a slot containing no MLI is generated and transmitted. The mobile station apparatus receives the third slot assuming that it contains MLI, and then the fourth and following slots assuming that they do not contain MLI and contain only CE and user data to demodulate user data. A case in which slots containing no MLI are transmitted one slot after receiving ACK by the base station apparatus is described in FIG. 7, but the present invention is not limited to this case. For example, after ACK is received by the base station apparatus, n (n is a natural number) slots containing MLI may be generated before generating slots containing no MLI.

Since, with the wireless communication system according to the second embodiment, as described above, slots containing no MLI are generated in the relevant communication frame after generating n (n is a natural number) slots containing MLI upon arrival of ACK, processing under a light load can be performed with sufficient lead time. Also, since a time required for generating n slots containing MLI after receiving ACK is allocated to preparations for generating slots containing no MLI, time management in slots can be performed.

(Third Embodiment)

Next, a wireless communication system according to a third embodiment will be described. An assumption of the MTPC systems is that a base station apparatus grasps channel conditions. Thus, it is possible to estimate the number of slots required for a mobile station apparatus to succeed in demodulation of MLI. Consequently, in the wireless communication system according to the third embodiment, information representing the number of slots containing MLI is added to the MLI in the base station apparatus. If the mobile station apparatus succeeds in demodulation of MLI and information representing the number of slots, the number of slots containing MLI can be grasped.

Figure 8:
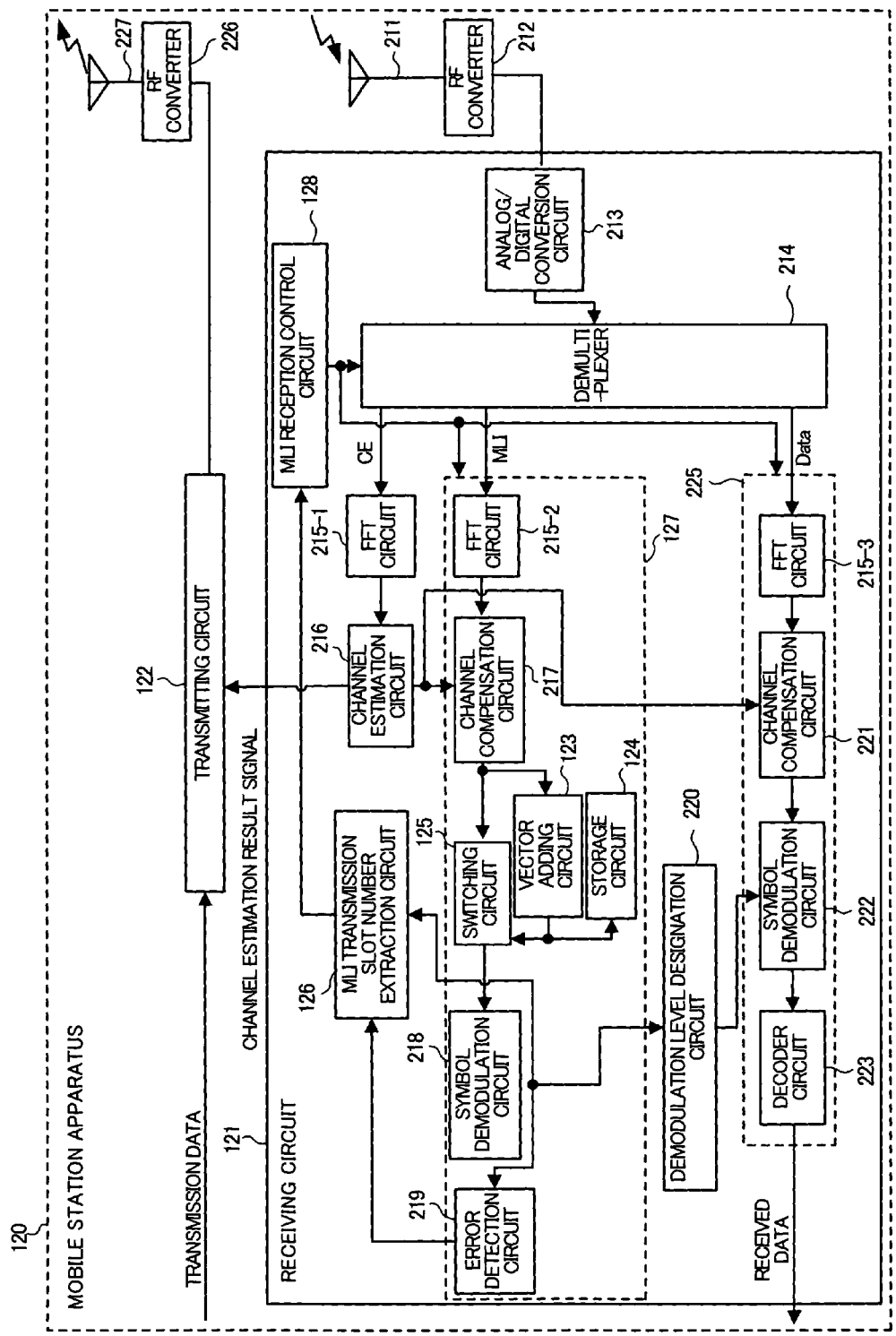
FIG. 8 is a block diagram showing a configuration of a mobile station apparatus according to a third embodiment.

FIG. 8 is a block diagram showing the configuration of a mobile station apparatus according to the third embodiment. The same reference numerals are attached to blocks with the same function as those of the mobile station apparatus according to the first embodiment shown in FIG. 3 for description. As shown in FIG. 8, a mobile station apparatus 120 has a receiving circuit 121 and a transmitting circuit 122. An RF signal received by the receiving antenna 211 is down-converted by the RF converter 212 and input into the receiving circuit 121. An output signal of the RF converter 212 input into the receiving circuit 121 is input into the analog/digital conversion circuit 213 to convert the signal from an analog signal into a digital signal. A digital signal output by the analog/digital conversion circuit 213 is input into the demultiplexer 214 to demultiplex and output the signal to the CE part 205, the MLI symbol part 206, and the user data symbol part 204 in accordance with the slot configuration shown in FIG. 17.

The Fourier transformation circuit (FFT circuit) 215-1 performs a Fourier transformation of an output signal of the demultiplexer 214 to reproduce a received CE. The channel estimation circuit 216 compares a received CE input from the Fourier transformation circuit 215-1 and the reference CE to estimate channel characteristics.

The Fourier transformation circuit (FFT) 215-2 performs a Fourier transformation of an output signal of the demultiplexer 214 to reproduce a received MLI symbol. The channel compensation circuit 217 makes channel compensation for a reproduced received MLI symbol based on an estimation result of the channel estimation circuit 216.

A vector adding circuit 123 performs a vector addition of an output signal of the channel compensation circuit 217 and an output signal of a storage circuit 124. The storage circuit 124 stores an output signal of the vector adding circuit 123. A switching circuit 125 switches an output signal of the channel compensation circuit 217 and an output signal of the vector adding circuit 123. The symbol demodulation circuit 218 demodulates MLI from MLI symbols output from the switching circuit 125. The error detection circuit 219 detects errors from an output signal of the symbol demodulation circuit 218 using error detecting code and the like.

Here, vector addition processing by the vector adding circuit 123 will be described with reference to a flow chart shown in FIG. 9. An operation of vector addition processing when an N-th slot after demodulation of MLI is received will be described below. When a demodulation operation starts, the switching circuit 125 is set to output an output signal of the channel compensation circuit 217.

Figure 9:
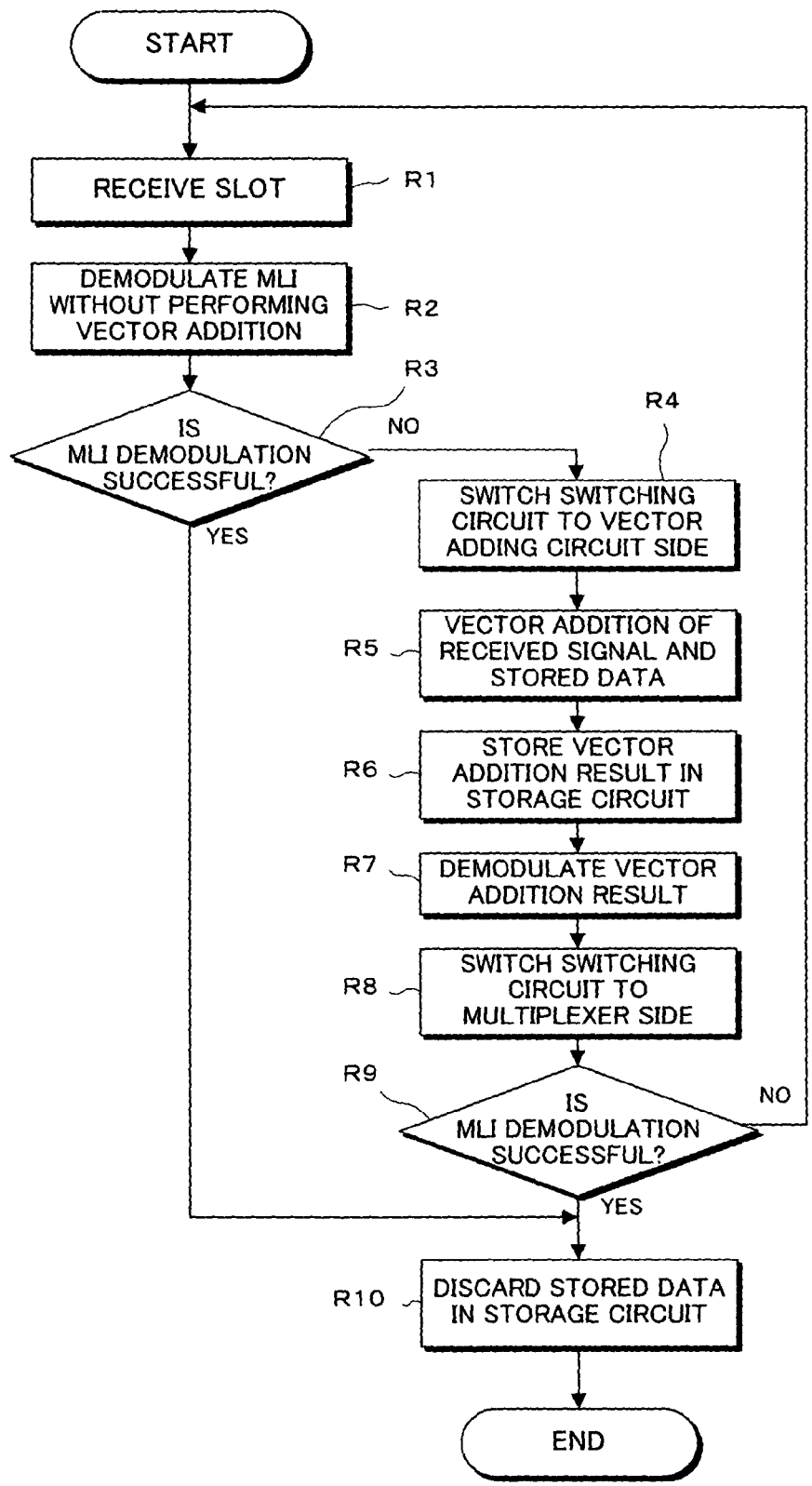
FIG. 9 is a flow chart showing a vector addition processing by a vector adding circuit.

In FIG. 9, the N-th slot is first received (step R1) and MLI of the received N-th slot is demodulated without performing a vector addition (step R2). The error detection circuit 219 determines whether or not MLI has been correctly demodulated (step R3) and, if MLI has not been correctly demodulated, the switching circuit 125 is switched to the vector adding circuit 123 side (step R4).

The vector adding circuit 123 performs a vector addition of an MLI symbol part of the N-th slot output by the channel compensation circuit 217 and a vector addition result of MLI symbol parts of the first slot to the (N−1)-th slot stored in the storage circuit 124 (step R5). The storage circuit 124 stores a vector addition result of MLI symbol parts of the first slot to the N-th slot output by the vector adding circuit 123 (step R6). Then, the symbol demodulation circuit 218 demodulates the vector addition result (step R7).

Next, the switching circuit 125 is switched to the channel compensation circuit 217 (step R8) to make the error detection circuit 219 determine whether or not the vector addition result has been correctly demodulated (step R9). If demodulation of the vector addition result is determined to have failed as a result of determination in step R9, the next step is to return to step R1 to receive the next (N+1)-th slot. Hereinafter, the operation follows rules described above. If demodulation is determined to have succeeded as a result of determination in step R3 or step R9, data stored in the storage circuit 124 is discarded (step R10). If demodulation of MLI is successful, user data in slots existing in the same communication frame is demodulated using the MLI. When the next communication frame is received, MLI is again demodulated by the above-described method.

That is, while MLI of each slot in the same communication frame is the same, there is no correlation among noise components contained in these slots. Therefore, by performing a vector addition as described above, only desired signal power can be strengthened to improve SNR.

If, in FIG. 8, no error is detected in an output signal of the symbol demodulation circuit 218, the error detection circuit 219 outputs data indicating successful demodulation of MLI to an MLI transmission slot number extraction circuit 126.

The demodulation level designation circuit 220 designates the demodulation level of each sub-carrier of user data based on the demodulated MLI.

The Fourier transformation circuit (FFT) 215-3 performs a Fourier transformation of an output signal of the demultiplexer 214 to reproduce a received user data. The channel compensation circuit 221 makes channel compensation for a reproduced received user data symbol based on an estimation result of the channel estimation circuit 216. The symbol demodulation circuit 222 demodulates the received user data symbol for which channel compensation has been made by the channel compensation circuit 221 by a demodulation level of the user data symbol part of each sub-carrier designated by the demodulation level designation circuit 220. The decoder circuit 223 performs error correction and decompression processing of encoded user data demodulated by the symbol demodulation circuit 222 to decode user data.

In the receiving circuit 121 shown in FIG. 8, components for demodulating CE, MLI, and user data can be summarized as shown below:

(1) The CE demodulation part composed of the FFT circuit 215-1
(2) An MLI demodulation part 127 composed of the FFT circuit 215-2, the channel compensation circuit 217, the vector adding circuit 123, the storage circuit 124, the switching circuit 125, the symbol demodulation circuit 218, and the error detection circuit 219

(3) The user data demodulation part 225 composed of the FFT circuit 215-3, the channel compensation circuit 221, the symbol demodulation circuit 222, and the decoder circuit 223

The MLI transmission slot number extraction circuit 126 extracts the number of transmitted slots from MLI input from the symbol demodulation circuit 218 and outputs the number to an MLI reception control circuit 128 when data to notify that no error has been detected is input from the error detection circuit 219. That is, in the wireless communication system according to the third embodiment, slot number information representing the number of slots containing MLI that the base station apparatus would transmit is added to the MLI. Thus, if the symbol demodulation circuit 218 succeeds in demodulation of MLI, the number of slots containing MLI can be grasped.

The MLI reception control circuit 128 controls, based on the number of transmitted slots input from the MLI transmission slot number extraction circuit 126, the demultiplexer 214, the MLI demodulation part 127, and the user data demodulation part 225. That is, demodulation processing of user data is performed by ignoring MLI until the number of received slots reaches the number of slots grasped by the MLI reception control circuit 128 because slots containing MLI are transmitted until then and, after the number of received slots reaches the number of slots grasped by the MLI reception control circuit 128, demodulation processing of user data is performed by assuming that slots containing no MLI are transmitted. MLI whose demodulation processing has successfully been performed by the symbol demodulation circuit 218 is used for performing demodulation processing of user data.

In the above description, an embodiment was shown in which a signal whose channel compensation has been made by the channel compensation circuit 217 is input into the vector adding circuit 123, and an output signal of the channel compensation circuit 217 and an output signal of the vector adding circuit 123 are switched by the switching circuit 125 to be input into the symbol demodulation circuit 218, but the present invention is not limited to this embodiment. For example, a configuration may be adopted in which an output signal of the demultiplexer 214 is directly input into the vector adding circuit 123, and an output signal of the demultiplexer 214 and an output signal of the vector adding circuit 123 are switched by the switching circuit 125 to be input into the FFT circuit 215-2.

In the mobile station apparatus 120, transmission data (user data) is input into the transmitting circuit 122. In the transmitting circuit 122, for example, coding processing, modulation processing, and processing to feedback a channel estimation result signal input from the channel estimation circuit 216 to a base station as information data are performed with respect to the transmission data. Then, the transmission data undergoes digital/analog conversion, and is up-converted into an RF signal by the RF converter 226 and transmitted by the transmitting antenna 227.

Figure 10:
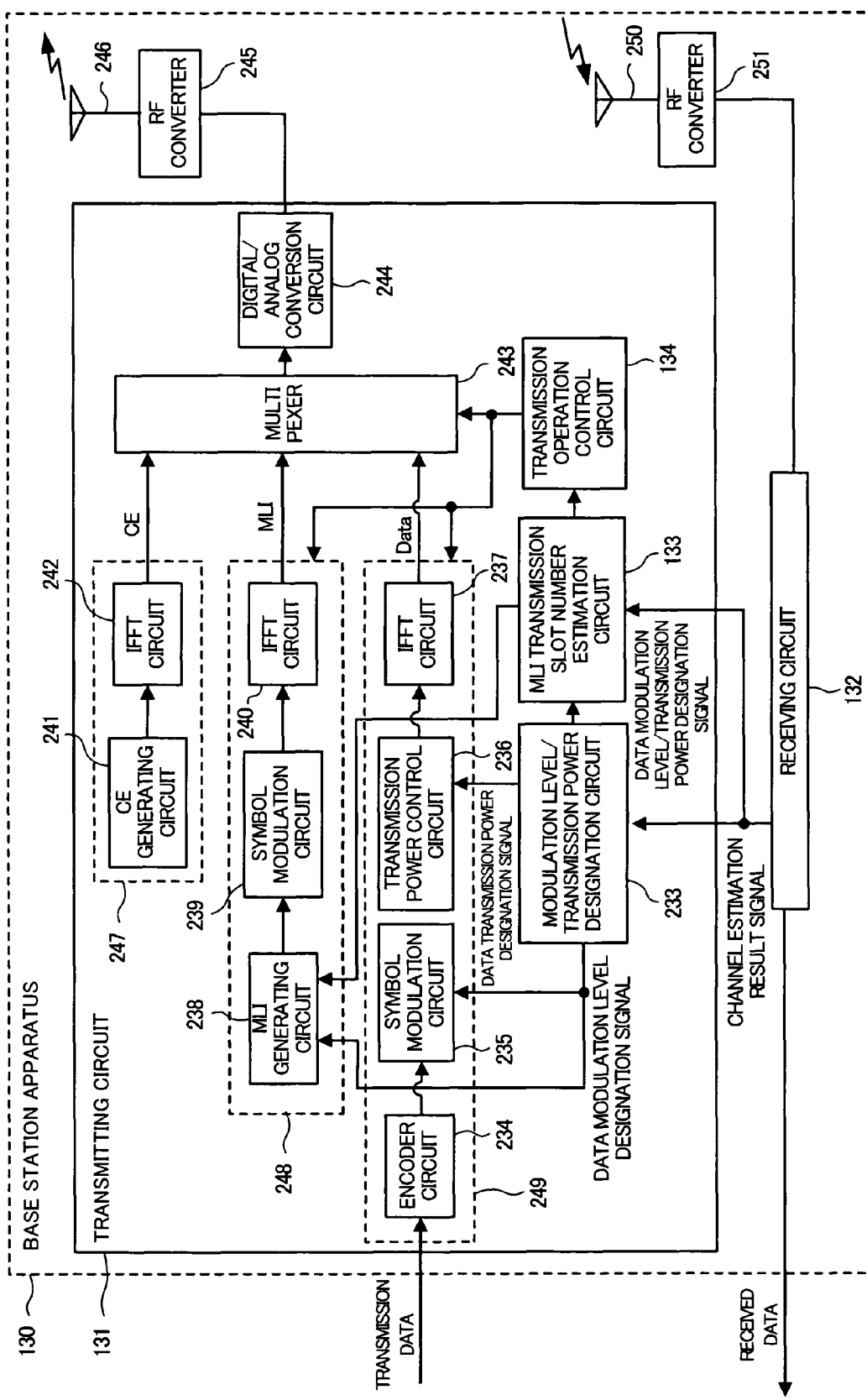
FIG. 10 is a block diagram showing a configuration of a base station apparatus according to the third embodiment.

Next, the configuration of a base station apparatus according to the third embodiment will be described with reference to FIG. 10. The same reference numerals are attached to blocks with the same function as those of the base station apparatus according to the first embodiment shown in FIG. 4 for description. As shown in FIG. 10, a base station apparatus 130 has the transmitting circuit 131 and the receiving circuit 132. In the transmitting circuit 131, the modulation level/transmission power designation circuit 233 determines, based on a channel estimation result signal acquired as received data by the receiving circuit 132, transmission power of each sub-carrier for transmitting user data (transmission data) and the modulation level of each sub-carrier for transmitting user data. The encoder circuit 234 performs processing such as compression coding of user data (transmission data) and addition of error correction code, and the symbol modulation circuit 235 modulates, based on the modulation level of each sub-carrier determined by the modulation level/transmission power designation circuit 233, user data encoded by the encoder circuit 234. The transmission power control circuit 236 regulates an output signal of the symbol modulation circuit 235 to a value determined by the modulation level/transmission power designation circuit 233 for each sub-carrier, and the IFFT circuit 237 performs an inverse Fourier transformation of an output signal of the transmission power control circuit 236 for output.

The MLI generating circuit 238 generates MLI based on the modulation level of each sub-carrier for transmitting user data determined by the modulation level/transmission power designation circuit 233. Also, the MLI generating circuit 238 adds, based on estimation data input from an MLI transmission slot number estimation circuit 133 described later, data representing the number of slots into which MLI should be incorporated to MLI. The symbol modulation circuit 239 modulates MLI generated by the MLI generating circuit 238. The IFFT circuit 240 performs an inverse Fourier transformation of an output signal of the symbol modulation circuit 239 for output.

The CE generating circuit 241 generates a CE and the IFFT circuit 242 performs an inverse Fourier transformation of a CE generated by the CE generating circuit 241 for output.

In the transmitting circuit 131 shown in FIG. 10, components for modulating CE, MLI, and user data can be summarized as shown below:
(1) The CE modulation part 247 composed of the CE generating circuit 241 and the IFFT circuit 242
(2) The MLI modulation part 248 composed of the MLI generating circuit 238, the symbol modulation circuit 239, and the IFFT circuit 240
(3) The user data modulation part 249 composed of the encoder circuit 234, the symbol modulation circuit 235, the transmission power control circuit 236, and the IFFT circuit 237

The multiplexer 243 multiplexes output signals of three IFFT circuits (237, 240, and 242) to match the slot configuration shown in FIG. 17.

The MLI transmission slot number estimation circuit 133 estimates, based on a channel estimation result signal input from the receiving circuit 132, the number of slots to be transmitted using the modulation level and transmission power designated by the modulation level/transmission power designation circuit 233 and outputs an estimation result to the MLI generating circuit 238 and a transmission operation control circuit 134.

The transmission operation control circuit 134 controls, based on an estimation result input from the MLI transmission slot number estimation circuit 133, the MLI modulation part 248, the user data modulation part 249, and the multiplexer 243 so that the estimated number of slots containing MLI are generated and, after the number of generated slots reaches the estimated number of slots, slots containing no MLI are generated.

The digital/analog conversion circuit 244 converts an output of the multiplexer 243 from a digital signal into an analog signal. An analog signal output by the digital/analog conversion circuit 244 is up-converted into an RF signal by the RF converter 245 and transmitted by the transmitting antenna 246.

An RF signal received by the receiving antenna 250 is down-converted by the RF converter 251 and input into the receiving circuit 132. In the receiving circuit 132, for example, analog/digital conversion processing, demultiplexing into various signals, and various demodulation processing are performed to output received data (user data). Also, in the receiving circuit 132, channel conditions are estimated based on a received signal and an estimation result signal is output to the transmitting circuit 131.

Figure 11:
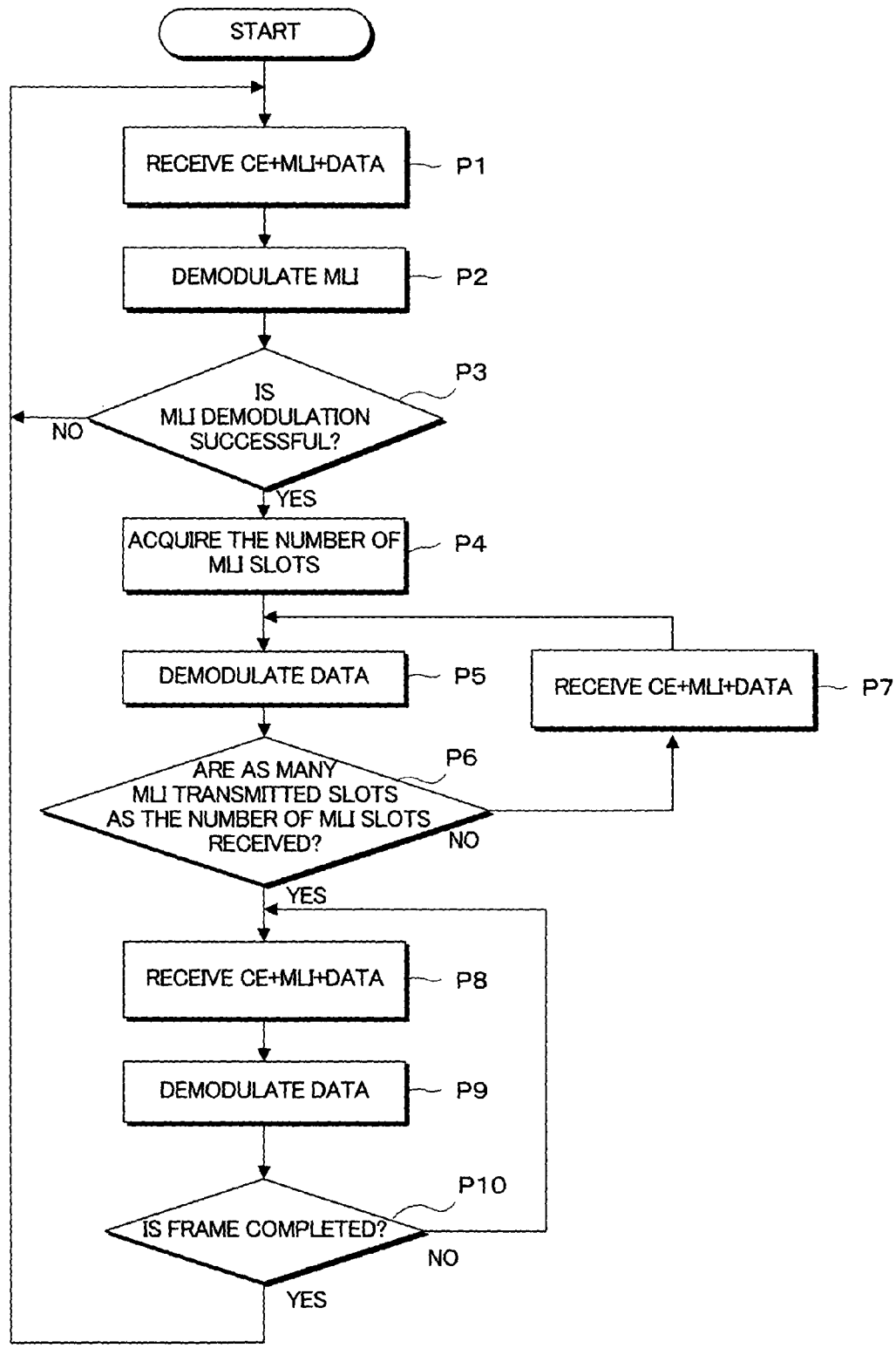
FIG. 11 is a flow chart showing an operation of the mobile station apparatus according to the third embodiment.

Next, an operation of the mobile station apparatus according to the third embodiment constructed as described above will be described with reference to a flow chart shown in FIG. 11. In the mobile station apparatus 120, when the receiving circuit 121 receives a slot containing CE, MLI, and user data (step P1), the MLI demodulation part 127 demodulates MLI (step P2). The MLI contains error checking bits and the like, and the error detection circuit 219 in the MLI demodulation part 127 determines whether or not demodulation of MLI has succeeded, that is, no error is detected (step P3). If demodulation of MLI fails, that is, an error is detected, preparations for receiving the next slot again are made after going back to step P1.

If, on the other hand, in step P3, demodulation of MLI is successful, that is, no error is detected, the MLI transmission slot number extraction circuit 126 acquires the number of slots containing MLI (number of MLI transmission slots) (step P4). This number of slots is, for example, three. The mobile station apparatus 120 receives slots assuming that slots containing MLI are transmitted until three slots are received, and then receives slots assuming that the fourth and following slots contain no MLI in the relevant communication frame.

Then, user data is demodulated based on MLI demodulated in step P2 (step P5) to determine whether or not as many slots as the number of MLI transmission slots ("three" in the above example) have been received (step P6). If as many slots as the number of MLI transmission slots have not been received, slots containing MLI, that is, slots containing CE, MLI, and user data are received (step P7). Here, since demodulation of MLI has succeeded in step P2, MLI received in step P7 is ignored.

If, in step P6, as many slots as the number of MLI transmission slots have been received, slots containing no MLI, that is, slots containing CE and user data successively transmitted from the base station apparatus are received (step P8). Then, MLI demodulated in step P2 is used to demodulate user data received in step P8 (step P9). Operations of step P8 to step P10 are repeated until the relevant communication frame is completed. That is, between a time when demodulation of MLI succeeds and a time when the relevant communication frame is completed, demodulation is performed under the assumption that received slots contain only CE and user data. If, in step P10, the relevant communication frame is completed, the next step is to go back to step P1 to receive slots under the assumption that slots containing MLI will be transmitted again in the next communication frame.

Figure 12:
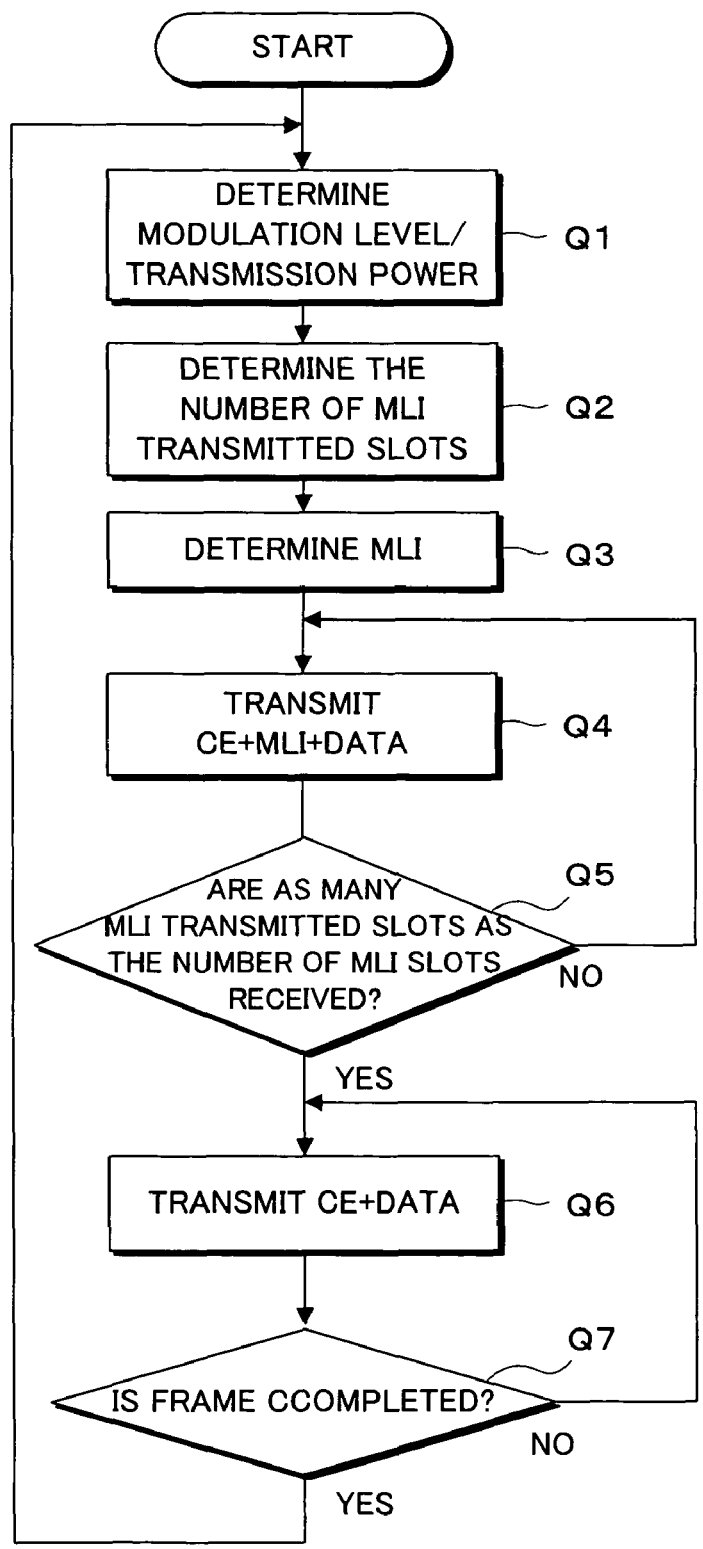
FIG. 12 is a flow chart showing an operation of the base station apparatus according to the third embodiment.

Next, an operation of the base station apparatus according to the third embodiment will be described with reference to a flow chart shown in FIG. 12. In the base station apparatus 130, the transmitting circuit 131 determines the modulation level and transmission power (step Q1). That is, it is assumed in the MTPC system that the base station apparatus 130 grasps a channel estimation result based on a feedback from the mobile station apparatus 120 and the like. The transmitting circuit 131 determines the modulation level and transmission power for each sub-carrier based on the channel estimation result so that SNR required for the mobile station apparatus 120 is obtained. Next, the MLI transmission slot number estimation circuit 133 in the transmitting circuit 131 estimates the number of slots of MLI to obtain SNR required for the mobile station apparatus 120 by performing a vector addition of MLI to determine the number of slots to be transmitted (step Q2). Here, if the mobile station apparatus 120 fails to demodulate MLI even if as many slots as determined above are received, user data cannot be demodulated until the next communication frame. Therefore, the number of slots thus determined must be determined so that sufficient signal power can be obtained for demodulating MLI in the mobile station apparatus 120.

Next, MLI generated by the MLI generating circuit 238 is determined (step Q3) and slots containing CE, the above determined MLI, and user data are transmitted (step Q4). If, here, the number of slots containing MLI is determined, for example, to be "three," the transmitting circuit 131 transmits only three slots to which MLI is added. Then, the fourth slot and following slots are transmitted without incorporating MLI in the slots until the next communication frame. That is, whether or not as many slots as the number of MLI transmission slots have been transmitted is determined (step Q5). If as many slots as the number of ML transmission slots have not been transmitted, the next step is to go to step Q4. If, on the other hand, as many slots as the number of MLI transmission slots have been transmitted, slots containing no MLI, that is, slots containing CE anduser data are transmitted (stepQ6). Next, whether or not the relevant communication frame is completed is determined (step Q7). If not completed, the next step is to go to step Q6. If completed, on the other hand, the next step is to return to Q1 to determine MLI again based on a channel estimation result and to start transmission of slots containing MLI.

By selecting the number of slots containing MLI as information all representing the same numeric value ("3" in the above example), as described above, it becomes possible for the mobile station apparatus to grasp the number of slots containing MLI by counting the number of slots received from the start of a communication frame and also to clearly distinguish between slots containing MLI and those containing no MLI.

Also, by defining the number of slots containing MLI as information representing the remaining number of times of transmission of slots containing MLI, even though a signal cannot be detected by the receiving circuit of the mobile station apparatus and a slot is missed, it is still possible to grasp how many slots containing MLI remain to be transmitted and in which stage slots containing no MLI will be transmitted without counting the number of received slots from the start of a communication frame if demodulation of MLI (and slot number information) in other slots is successful. This enables the mobile station apparatus to prevent reception of a slot containing no MLI as one containing MLI by mistake.

Further, in the wireless communication system according to the first embodiment, slots containing MLI change depending on mobile station apparatus conditions because slots containing no MLI are generated after waiting for reception of ACK. In contrast, in the wireless communication system according to the third embodiment, if demodulation of a slot containing any of MLI is successful in the mobile station apparatus, processing in the mobile station apparatus is simplified because the number of slots containing MLI becomes evident.

Since, with the wireless communication system according to the third embodiment, as described above, transmission of unnecessary MLI is eliminated, a time occupied by unnecessary MLI in a slot is eliminated and the time can now be used for transmission of user data. As a result, improvement of transmission efficiency can be sought.

(Fourth Embodiment)

In a wireless communication system according to a fourth embodiment, as described above, the slot length is shortened by deleting a time allocated to unnecessary MLI in a slot when generating slots containing no MLI. Then, as a result of shortened slot length, slots having a shortened slot length containing no MLI are further generated in accordance with an idle time generated in one communication frame.

Figure 13:
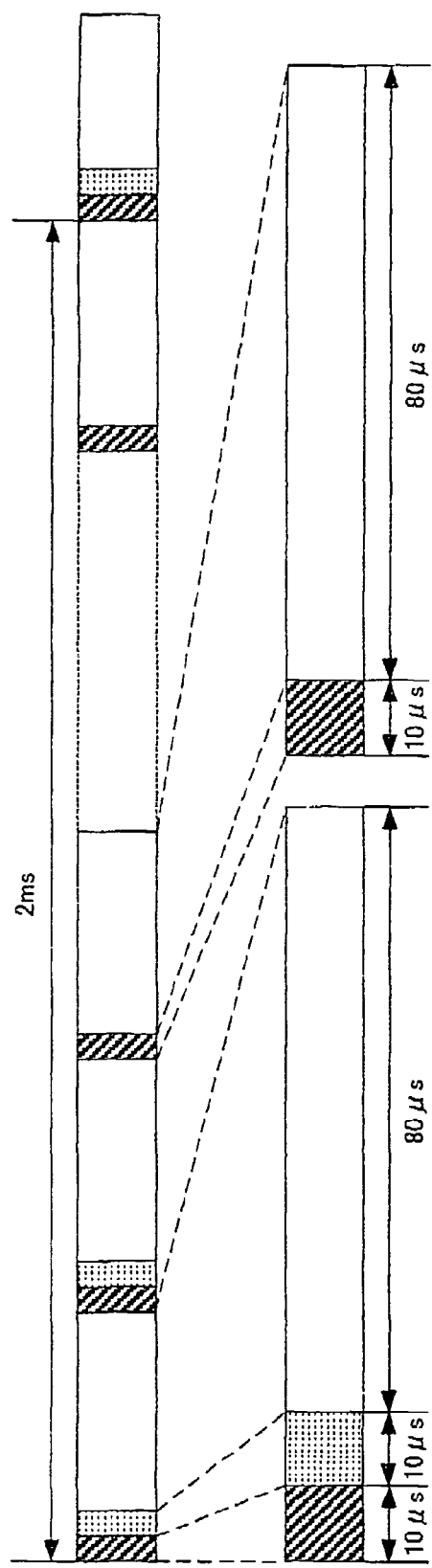
FIG. 13 is a diagram showing a configuration example of a frame format of a wireless communication system according to a fourth embodiment.

FIG. 13 is a diagram showing a configuration example of the frame format of the wireless communication system according to the fourth embodiment. Assuming, for example, that the frame length of one communication frame is fixed at 2 ms, and 10 μs is allocated to CE, 10 μs to MLI, and 80 μs to user data. In FIG. 13, MLI is contained in the first to third slots, but MLI is not contained in the fourth and following slots. Thus, while the slot length of a slot containing MLI is 100 μs, the slot length of a slot containing no MLI is 90 μs. Since the frame length is fixed at 2 ms, 20 slots can be transmitted in one communication frame when MLI is transmitted in all slots like a conventional technology, but in the fourth embodiment, up to 22 slots can be transmitted.

With the wireless communication system according to the fourth embodiment, as described above, the number of slots that can exist in a communication frame of the same time length as a conventional communication frame can be increased. Since this enables transmission of more user data, improvement of transmission efficiency can be sought.

(Fifth Embodiment)

In a wireless communication system according to a fifth embodiment, as described above, instead of MLI, user data is allocated to a time that has been allocated to MLI in a slot when generating slots containing no MLI. Then, slots containing no MLI are generated without changing the slot length. The present invention is suitable to a system like TDMA, for example, in which the slot length must be maintained constant.

Figure 14:
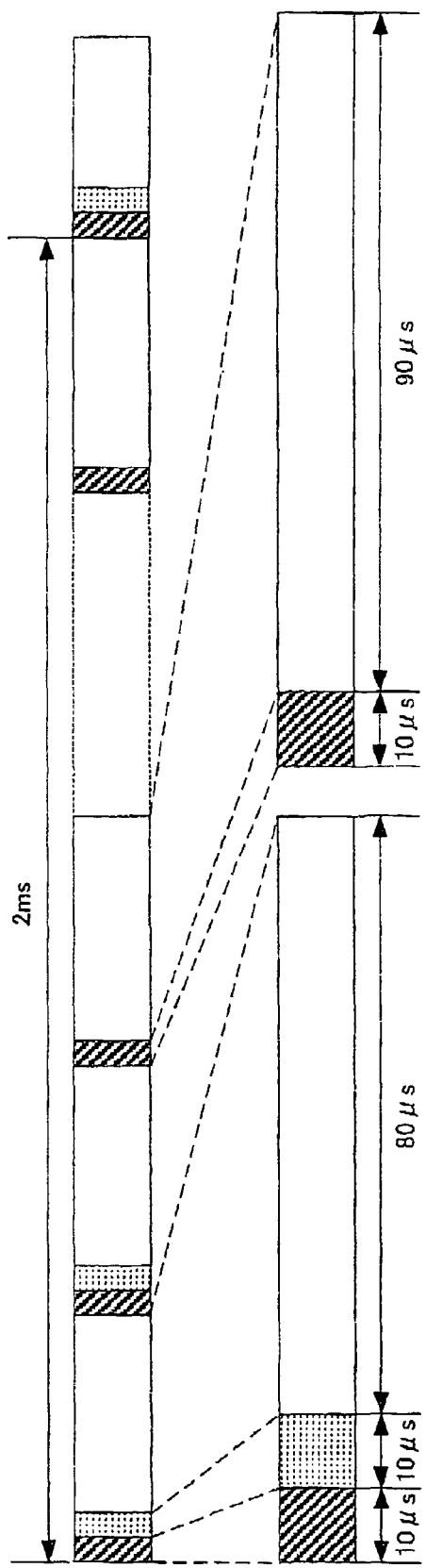
FIG. 14 is a diagram showing a configuration example of the frame format of a wireless communication system according to a fifth embodiment.
Figure 15:
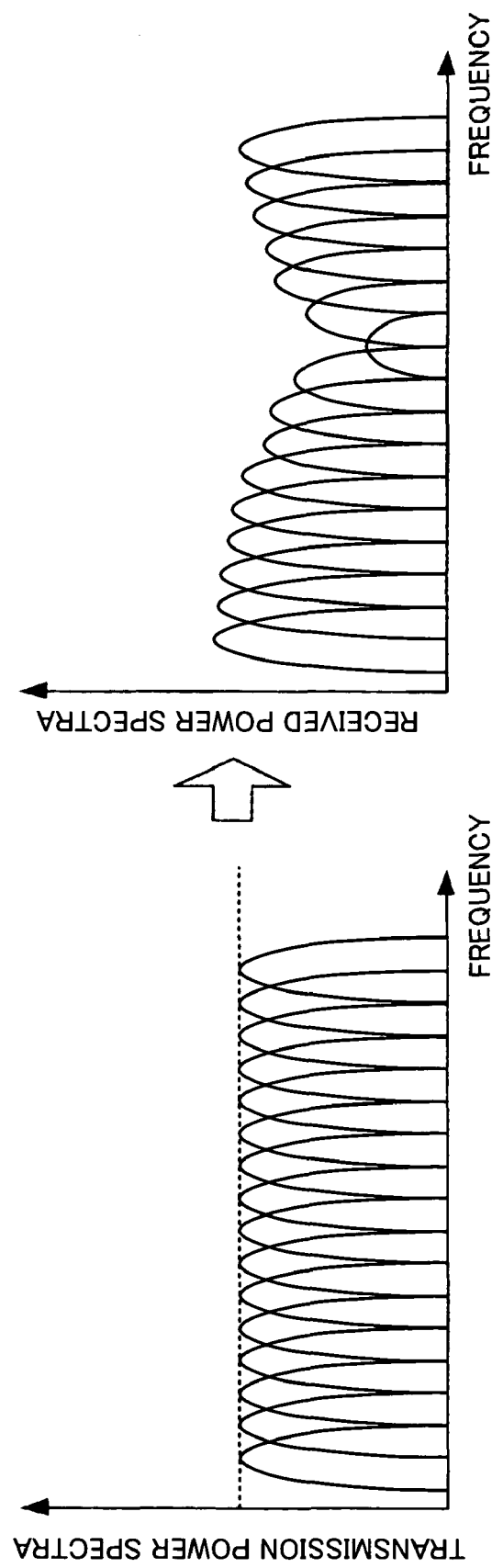
FIG. 15 is a diagram showing spectra in an orthogonal frequency division multiple system.
Figure 16:
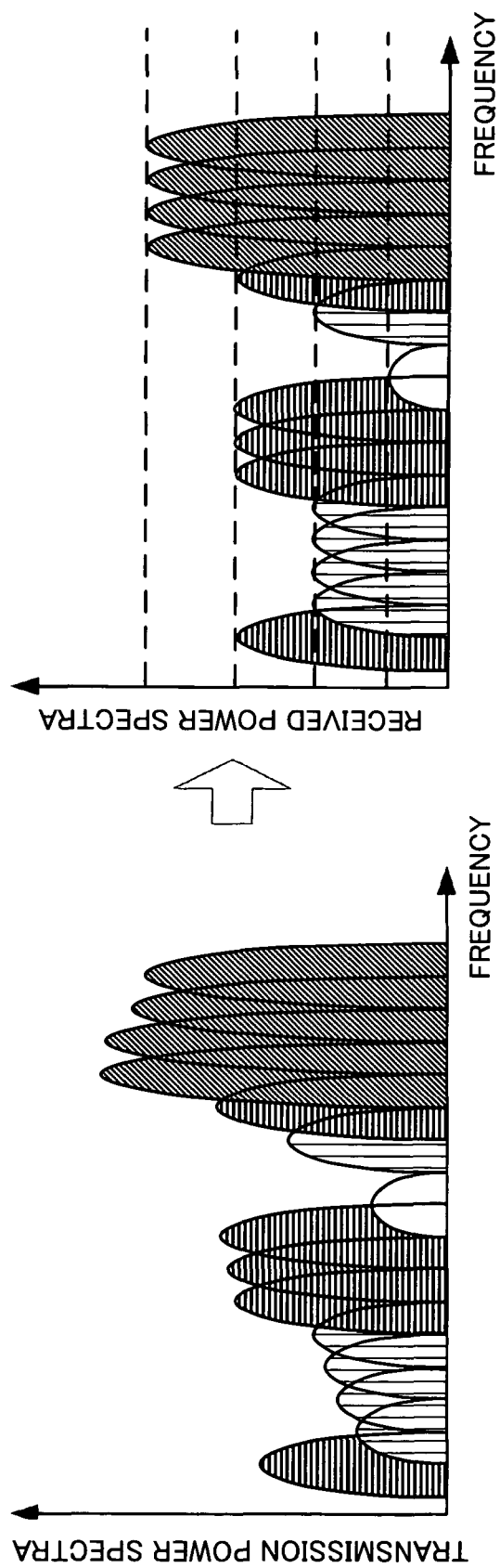
FIG. 16 is a diagram showing spectra in an orthogonal frequency division multiple system using a multi-level transmission power control system.

FIG. 14 is a diagram showing a configuration example of the frame format of the wireless communication system according to the fifth embodiment. Assume, for example, that the frame length of one communication frame is fixed at 2 ms, and 10 μs is allocated to CE, 10 μs to MLI, and 80 μs to user data. In slots containing no MLI, a section that has been allocated to MLI is replaced by a user data section so that an originally allocated user data section is extended. That is, a time of 10 μs has been allocated to MLI and, by allocating user data to the time instead, the section allocated to user data is increased by 10 μs to a total of 90 μs. Though the number of slots in one communication frame of this system is 20 and thus the same as that of a conventional communication frame, transmission efficiency can be improved because user data occupies a larger portion in a slot.

With the wireless communication system according to the fifth embodiment, as described above, a ratio occupied by user data in a slot of the same time length as a conventional slot can be increased. Since this enables transmission of more user data, improvement of transmission efficiency can be sought.

Explanation of Reference Numerals

103: Reception operation control circuit
113: Transmission operation control circuit
123: Vector adding circuit
124: Storage circuit
125: Switching circuit
126: MLI transmission slot number extraction circuit
128: MLI reception control circuit
133: MLI transmission slot number estimation circuit
134: Transmission operation control circuit

The invention claimed is:

1. A mobile station apparatus in a communication system that applies an adaptive modulation level at which a base station apparatus transmits to the mobile station apparatus a slot that can transmit user data and modulation level information indicative of a modulation level of said user data, the mobile station apparatus comprising:

a receiving section configured to receive a plurality of slots, where each slot contains user data; and a demodulation section configured to demodulate the user data based on modulation level information contained in the latest slot of the received slots containing modulation level information in case that the most recently received slot does not contain modulation level information.

2. A communication method of a mobile station apparatus in a communication system that applies an adaptive modulation level at which a base station apparatus transmits to the mobile station apparatus a slot that can transmit user data and modulation level information indicative of a modulation level of said user data, the communication method comprising:

receiving a plurality of slots, where each slot contains user data; and demodulating the user data based on modulation level information contained in the latest slot of the received slots containing modulation level information in case that the most recently received slot does not contain modulation level information.

3. A mobile station apparatus in a communication system that applies an adaptive modulation level at which a base station apparatus transmits to the mobile station apparatus a slot that can transmit user data and modulation level information indicative of a modulation level of said user data, the mobile station apparatus comprising:

a receiving section configured to receive both a first slot containing user data and modulation level information and the receiving section configured to receive a second slot containing user data without modulation level information, wherein the second slot is received after the first slot; and a demodulation section configured to demodulate the user data, received in the first slot, based on the modulation level information and the demodulation section configured to demodulate the user data, received in the second slot, based on modulation level information contained in the first slot in case that the second slot does not contain modulation level information.

4. A communication method of a mobile station apparatus in a communication system that applies an adaptive modulation level at which a base station apparatus transmits to the mobile station apparatus a slot that can transmit user data and modulation level information indicative of a modulation level of said user data, the communication method comprising:

receiving a first slot containing both user data and modulation level information;

demodulating the user data, received in the first slot, based on the modulation level information;

receiving a second slot containing user data without modulation level information, wherein the second slot is received after the first slot; and demodulating the user data, received in the second slot, based on modulation level information contained in the first slot in case that the second slot does not contain modulation level information.

* * * * *